US008529976B2

(12) United States Patent
McMindes et al.

(10) Patent No.: US 8,529,976 B2
(45) Date of Patent: Sep. 10, 2013

(54) PROTEIN COMPOSITION AND ITS USE IN RESTRUCTURED MEAT

(75) Inventors: Matthew K. McMindes, Chesterfield, MO (US); Eduardo Godinez, Chesterfield, MO (US); Izumi Mueller, Glen Carbon, IL (US); Mac W. Orcutt, St. Louis, MO (US); Patricia A. Altemueller, Webster Groves, MO (US)

(73) Assignee: Solae, LLC, St. Louis, MO (US)

( * ) Notice: Subject to any disclaimer, the term of this patent is extended or adjusted under 35 U.S.C. 154(b) by 1170 days.

(21) Appl. No.: 11/749,590

(22) Filed: May 16, 2007

(65) Prior Publication Data

US 2007/0269567 A1   Nov. 22, 2007

Related U.S. Application Data

(63) Continuation-in-part of application No. 11/437,164, filed on May 19, 2006, now abandoned.

(51) Int. Cl.
*A23L 1/27* (2006.01)

(52) U.S. Cl.
USPC ........... 426/540; 426/516; 426/580; 426/601; 426/615; 426/641; 426/644; 426/646; 426/656

(58) Field of Classification Search
USPC ................. 426/540, 516, 580, 601, 615, 641, 426/644, 646, 656
See application file for complete search history.

(56) References Cited

U.S. PATENT DOCUMENTS

| | | | |
|---|---|---|---|
| 2,682,466 A | 6/1954 | Boyer | |
| 3,102,031 A | 8/1963 | MacAllister | |
| 3,117,006 A | 1/1964 | Wenger et al. | |
| 3,488,770 A | 1/1970 | Atkinson | |
| 3,662,671 A | 5/1972 | Frederiksen et al. | |
| 3,662,672 A | 5/1972 | Hoer | |
| 3,793,466 A | 2/1974 | Hawkins et al. | |
| 3,814,823 A | 6/1974 | Yang et al. | |
| 3,846,564 A * | 11/1974 | Malin | 426/646 |
| 3,883,672 A | 5/1975 | Bone et al. | |
| 3,886,299 A | 5/1975 | Feldbrugge et al. | |
| 3,900,576 A | 8/1975 | Schulz | |
| 3,903,315 A | 9/1975 | Giles et al. | |
| 3,904,770 A * | 9/1975 | Hale et al. | 426/645 |
| 3,904,775 A * | 9/1975 | Harwood et al. | 426/641 |
| 3,914,459 A * | 10/1975 | Jones | 426/645 |
| 3,928,652 A | 12/1975 | Lanter | |
| 3,930,033 A | 12/1975 | Corliss | |
| 3,934,050 A | 1/1976 | Hawkins | |
| 3,939,284 A * | 2/1976 | Akin et al. | 426/250 |

(Continued)

FOREIGN PATENT DOCUMENTS

| | | |
|---|---|---|
| CN | 687116 | 9/1996 |
| DE | 139385 | 1/1980 |

(Continued)

OTHER PUBLICATIONS

Reader's Digest. Mar. 2009. http://www.rd.com/health/healthy-eating-secret-from-japan-bonito-broth/.*

(Continued)

*Primary Examiner* — Anthony Weier

(57) ABSTRACT

The invention provides protein compositions containing structured protein products having protein fibers that are substantially aligned.

13 Claims, 5 Drawing Sheets

(56) References Cited

U.S. PATENT DOCUMENTS

| | | | |
|---|---|---|---|
| 3,940,500 A | | 2/1976 | Sortwell |
| 3,987,213 A | * | 10/1976 | Hawkins ........................ 426/656 |
| 4,001,441 A | * | 1/1977 | Liepa ............................ 426/104 |
| 4,032,666 A | | 6/1977 | Obata et al. |
| 4,052,517 A | | 10/1977 | Youngquist |
| 4,061,789 A | | 12/1977 | Warren et al. |
| 4,084,017 A | | 4/1978 | Kim et al. |
| 4,118,164 A | | 10/1978 | Wenger et al. |
| 4,125,630 A | | 11/1978 | Orthoefer |
| 4,125,635 A | | 11/1978 | de Ruyter |
| 4,145,447 A | | 3/1979 | Fisher et al. |
| 4,216,240 A | | 8/1980 | Shirai et al. |
| 4,219,576 A | | 8/1980 | Kawasaki et al. |
| 4,287,219 A | | 9/1981 | Fabre |
| 4,303,682 A | | 12/1981 | Guitteny et al. |
| 4,332,823 A | | 6/1982 | Buemi |
| 4,338,340 A | | 7/1982 | Morimoto et al. |
| 4,369,195 A | | 1/1983 | Nelson et al. |
| 4,376,134 A | | 3/1983 | Kumar |
| 4,423,083 A | * | 12/1983 | Shenouda ..................... 426/574 |
| 4,439,456 A | | 3/1984 | Kammuri et al. |
| 4,490,397 A | | 12/1984 | Maurice et al. |
| 4,495,205 A | | 1/1985 | Brander et al. |
| 4,517,218 A | | 5/1985 | Yackel, Jr. et al. |
| 4,562,082 A | | 12/1985 | Morimoto |
| 4,579,741 A | | 4/1986 | Hanson et al. |
| 4,590,079 A | | 5/1986 | Nishimori et al. |
| 4,763,569 A | | 8/1988 | Wenger et al. |
| 4,863,749 A | | 9/1989 | Yamada |
| 4,910,040 A | | 3/1990 | Sagarino et al. |
| 4,975,294 A | * | 12/1990 | Cohen ........................... 426/272 |
| 5,039,543 A | | 8/1991 | Lee et al. |
| 5,068,117 A | * | 11/1991 | McCabe ....................... 426/511 |
| 5,300,312 A | | 4/1994 | Lusas et al. |
| 5,333,538 A | | 8/1994 | Sawa |
| 5,437,885 A | * | 8/1995 | Lusas et al. ................... 426/302 |
| 5,731,029 A | | 3/1998 | Karwowski et al. |
| 5,804,246 A | | 9/1998 | Peck et al. |
| 5,922,392 A | | 7/1999 | Kelly et al. |
| 5,945,152 A | | 8/1999 | Purser |
| 6,319,539 B1 | | 11/2001 | Shemer et al. |
| 6,358,547 B1 | | 3/2002 | Dupont |
| 6,379,738 B1 | | 4/2002 | Dingman et al. |
| 6,635,301 B1 | | 10/2003 | Howsam |
| 7,887,870 B2 | * | 2/2011 | McMindes et al. ........... 426/646 |
| 2002/0142086 A1 | | 10/2002 | Gaebler et al. |
| 2002/0160097 A1 | | 10/2002 | Altemueller et al. |
| 2004/0206246 A1 | | 10/2004 | Bortone et al. |
| 2005/0112271 A1 | | 5/2005 | Pickarski |
| 2006/0035003 A1 | | 2/2006 | McMindes et al. |
| 2006/0035005 A1 | | 2/2006 | McMindes et al. |
| 2006/0035006 A1 | | 2/2006 | McMindes |
| 2006/0073261 A1 | | 4/2006 | McMindes et al. |
| 2006/0141125 A1 | * | 6/2006 | Gifford ......................... 426/656 |
| 2007/0148323 A1 | | 6/2007 | Dingman et al. |
| 2007/0269567 A1 | | 11/2007 | McMindes et al. |
| 2007/0269583 A1 | | 11/2007 | McMindes et al. |
| 2008/0069926 A1 | | 3/2008 | Mueller et al. |
| 2008/0069927 A1 | | 3/2008 | Altemueller et al. |
| 2008/0075808 A1 | | 3/2008 | Altemueller et al. |
| 2008/0118607 A1 | | 5/2008 | Sandoval et al. |
| 2008/0166443 A1 | | 7/2008 | Busse et al. |
| 2008/0233244 A1 | | 9/2008 | Swenson |
| 2008/0248167 A1 | | 10/2008 | McMindes et al. |
| 2008/0254167 A1 | | 10/2008 | McMindes et al. |
| 2008/0254168 A1 | | 10/2008 | Mueller et al. |
| 2008/0254199 A1 | | 10/2008 | Orcutt et al. |
| 2008/0268112 A1 | | 10/2008 | Rolan et al. |
| 2009/0123629 A1 | | 5/2009 | Chang et al. |
| 2009/0208633 A1 | | 8/2009 | Kyed et al. |
| 2010/0166940 A1 | | 7/2010 | McMindes et al. |

FOREIGN PATENT DOCUMENTS

| | | |
|---|---|---|
| EP | 0048533 | 3/1982 |
| EP | 0048533 A | 3/1982 |
| EP | 1180332 | 2/2002 |
| GB | 1448875 | 9/1976 |
| GB | 1464376 | 2/1977 |
| GB | 152471 | 9/1978 |
| GB | 1552091 | 9/1979 |
| JP | 58155060 | 9/1983 |
| JP | 61260839 | 11/1986 |
| JP | 63068060 | 3/1988 |
| JP | 01043159 | 2/1989 |
| JP | 04293455 | 10/1992 |
| JP | 08066157 | 3/1996 |
| JP | 2002000237 | 1/2002 |
| MX | PA05004544 | 7/2006 |
| WO | WO8806001 A | 8/1988 |
| WO | 00069276 | 11/2000 |
| WO | 03070007 | 8/2003 |
| WO | 2004016097 | 2/2004 |
| WO | 2004045301 | 6/2004 |
| WO | 2005092115 | 10/2005 |
| WO | 2005096834 | 10/2005 |
| WO | WO2006023518 A | 3/2006 |
| WO | 2006023518 | 4/2006 |
| WO | 2006041966 | 4/2006 |
| WO | 2007098125 | 4/2007 |
| WO | 2007137122 | 11/2007 |
| WO | 2007137125 | 11/2007 |
| WO | 2008036906 | 3/2008 |
| WO | 2008043076 | 4/2008 |
| WO | 2008064224 | 5/2008 |

OTHER PUBLICATIONS

Office Action from United States Patent and Trademark Office for U.S. Appl. No. 11/244,941; Jun. 24, 2008.

Communication from European Patent Office Examining Division for EP Patent Application No. 07842971.9; Jul. 31, 2009.

Office Action from United States Patent and Trademark Office for U.S. Appl. No. 10/919,421; Jun. 23, 2008.

Office Action from United States Patent and Trademark Office for U.S. Appl. No. 11/244,941; Nov. 25, 2008.

Office Action from United States Patent and Trademark Office for U.S. Appl. No. 11/244,941; Aug. 31, 2010.

Office Action from United States Patent and Trademark Office for U.S. Appl. No. 11/244,941; Jan. 24, 2008.

Database WPI Week 198701, Thomson Scientific, London, GB; AN 1987-002391, XP002497680 & JP61260839 A, Nov. 19, 1986 Abstract.

Association of American Feed Control Officials, Incorporated, "Feed Ingredient Definitions" 2008 p. 259.

Yacu, Waleed, Presentation "Thermoplastic and Food Extrusion General Introduction", pp. 11-12 & 34, Jun. 25-27, 1990, East Brunswick, NJ.

Hauck, B.W., "Process Variables and their Control for the Production of Expanded Products by Extrusion Cooking", pp. 29-30, Jan. 30, 1981, Sabetha, KS.

Kearns, Joseph P. et al., Presented at the World Congress "Extrusion of Texturized Proteins", pp. 25, 31, 36-37, Oct. 2-7, 1988, Singapore.

Rokey, Galen J. et al., Presentation "Extrusion Cooked and Textured Defatted Soybean Flours and Protein Concentrates", p. 12, Sep. 1992, Budapest, Hungary.

Wenger Manufactured, Inc., "Textured Vegetable Proteins", pp. 12-13, 2000, Sabetha, KS.

Konwinski, Arthur H., "Soy Protein Concentrate Processing and Chacteristics", Jul. 1, 1991, Orange Beach, AL.

Konwinski, Arthur H., Presentation "Applications of Soy in meats", Jun. 18-20, 2001, Urbana, IL.

Cheftel, J.C. et al., "New Protein Texturization Processes by Extrusion Cooking at High Moisture Levels", Food Reviews International, 8(2), 235-275 (1992).

Clextral Group, "Protein Fibration", Marketing Material, author unknown, date unknown.

Greentex®, "High Quality Textured Soy Protein", Marketing Material, author unknown, date unknown.

Vetex®, "Live Your Life to the Fullest", Marketing Material, author unknown, date unknown.

Office Action from United States Patent and Trademark Ofice for U.S. Appl. No. 11/244,941; Apr. 21, 2010.
Office Action from the Unite States Patent and Trademark Office for U.S. Appl. No. 10/919,41; Jan. 8, 2009.
Communication from European Patent Office Examining Division for EP Patent Application No. 05808397.3; May 20, 2008.
Communication from European Patent Office Examining Division for EP Patent Application No. 05808397.3; Dec. 11. 2008.
Office Action from United States Patent and Trademark Office for U.S. Appl. No. 11/437,184; Oct. 8, 2009.
Communication from European Patent Office Examining Division for EP Patent Application No. 07783880.3; Apr. 21, 2009.
Communication from European Patent Office Examining Division for EP Patent Application No. 07762236.3; Apr. 22, 2009.
Office Action from United States Patent and Trademark Office for U.S. Appl. No. 10/959,277; Jan. 9, 2008.
Office Action from United States Patent and Trademark Office for U.S. Appl. No. 10/959,277; Jul. 2, 2008.
Office Action from United States Patent and Trademark Office for U.S. Appl. No. 10/919,421; Jul. 21, 2009.
Office Action from United States Patent and Trademark Office for U.S. Appl. No. 10/919,421; Mar. 26, 2010.
Office Action from United States Patent and Trademark Office for U.S. Appl. No. 10/919,421; Jul. 7, 2010.
Office Action from United States Patent and Trademark Office for U.S. Appl. No. 11/204,454; Jun. 23, 2008.
Office Action from United States Patent and Trademark Office for U.S. Appl. No. 11/204,454; Jan. 7, 2009.
Office Action from United States Patent and Trademark Office for U.S. Appl. No. 11/204,454; Apr. 2, 2010.
Exam Report From Austailian Patent Ofice for AU Application No. 20052774825; Apr. 27, 2010.
Communication from European Patent Office Examining Division for EP Patent Application No. 05785241.0; Mar. 18, 2008.
Office Action from United States Patent and Trademark Office for U.S. Appl. No. 11/244,941; Apr. 21, 2010.
Communication from European Patent Office Examining Division for EP Patent Application No. 08799773.0; Aug. 5, 2010.
Communication from European Patent Office Examining Division for EP Patent Application No. 07842902.4; Jul. 31, 2009.
Lecomte, N. B. et al., "Soya Proteins Functional and Sensory Characteristics Improved in Comminuted Meats", Journal of Food Science, Vol, 58 (1993) No. 3 pp. 464-466 & 472.
Office Action from United States Patent and Trademark Office for U.S. Appl. No. 11/857,876; Aug. 6, 2010.
Hernandez, Ernesto. "Infusing foods with fish oil", May 1, 2004.
Office Action from United States Patent and Trademark Office for U.S. Appl. No. 11/852,637; Jun. 24, 2009.
Office Action from United States Patent and Trademark Office for U.S. Appl. No. 11/852,637; Aug. 3, 2010.

Communication from European Patent Office Examining Division for EP Patent Application No. 07842508.9; Sep. 16, 2009.
Office Action from United States Patent and Trademark Office for U.S. Appl. No. 11/963,375; Apr. 1, 2010.
Office Action from United States Patent and Trademark Office for U.S. Appl. No. 11/942,860; Jun. 25, 2009.
Office Action from United States Patent and Trademark Office for U.S. Appl. No. 11/942,860; Apr. 2. 2010.
Office Action from United States Patent and Trademark Office for U.S. Appl. No. 11/942,860; Aug. 3, 2010.
Office Action from United States Patent and Trademark Office for U.S. Appl. No. 12/062,366; Apr. 2, 2010.
Office Action from United States Patent and Trademark Office for U.S. Appl. No. 12/062,366; Sep. 3, 2010.
Office Action from United States Patent and Trademark Office for U.S. Appl. No. 12/059,961; Jun. 4, 2010
Communication from European Patent Office Examining Division for EP Patent Application No. 08799773.0; Jan. 20, 2010.
Communication from European Patent Office Examining Division for EP Patent Application No. 08799773.0; Apr. 21, 2010.
Pedersen, H. E. et al., "Meat and Vegetarian Applications of Soy Protein Concentrates," Food Tech Europe, vol. 1, No. 5, 1994, pp. 90. 92, 94, XP009058004.
Beery. K. E. et al., "Preparation of Soy Protein Concentrate Products and Their Application in Food Systems" American Oil Chemists Society 1991, 23, 8G9.
Office Action from United States Patent and Trademark Office for U.S. Appl. No. 10/959,277; Jun. 29, 2009.
Office Action from United States Patent and Trademark Office for U.S. Appl. No. 10/959,277; Aug. 6, 2010.
Office Action from United States Patent and Trademark Office for U.S. Appl. No. 10/959,277; Nov. 21, 2008.
Office Action from United States Patent and Trademark Office for U.S. Appl. No. 10/959,277; Jan. 25, 2010.
Office Action from United States Patent and Trademark Office for U.S. Appl. No. 10/959277; Aug. 28, 2008.
Office Action from United States Patent and Trademark Office for U.S. App. No. 10/959,277; Sep. 28, 2009.
Communication from European Patent Office Examining Division for EP Patent Applicaion No. 07842902.4; Sep. 9, 2009.
Database WPI Week 198343, Derwent Publications LTD., London, GB; AN 1983-797632, XP00246-1088 & JP581555060 a (Cho Chokan S) Sep. 14, 1983 Abstract.
Office Action from United States Patent and Trademark Office for U.S. Appl. No. 12/444,111, May 24, 2013.
Office Action from Chinese Patent and Trademark Office for CN Patent Application No. 201080048380.6, Apr. 1, 2013.
Office Action from Canadian Patent and Trademark Office for Canada Patent Application No. 2652380, Jun. 14, 2013.

* cited by examiner

PROTEIN COMPOSITION AND ITS USE IN RESTRUCTURED MEAT

CROSS REFERENCE TO RELATED APPLICATIONS

This is a continuation-in-part patent application of U.S. patent application Ser. No. 11/437,164, filed on May 19, 2006.

FIELD OF THE INVENTION

The present invention provides a protein composition and the use of the protein composition in vegetable products, fruit products, and in restructured meat products. The invention further provides a process for preparing the hydrated and shredded protein composition.

BACKGROUND OF THE INVENTION

An important aspect of the present invention is the development of an unstructured protein product into a structured protein product. Particularly, in one embodiment, the present invention provides a product and method for taking an unstructurized protein product with no visible grain or texture and converting it into a structurized, protein product with a definite shape having the consistency of cooked muscle meat.

The term "structure" describes a wide variety of physical properties of a food product. A product of acceptable structure is usually synonymous with the quality of a product. Structure has been defined as "the attribute of a substance resulting from a combination of physical properties and perceived by senses of touch, including kinesthesia and mouth feel, sight, and hearing. Structure, as defined by the International Organization of Standardization, is "all of the rheological and structural (geometric and surface) attributes of a food product perceptible by means of mechanical, tactual and, where appropriate, visual and auditory receptors." The following terms have been used to describe product characteristics falling under the umbrella "structure":

TABLE I

ABRIDGED LIST OF FOOD STRUCTURE ADJECTIVES

| Adhesive | Fleshy | Mushy | Soft |
| --- | --- | --- | --- |
| Bouncy | Fluffy | Oily | Soggy |
| Brittle | Foamy | Pasty | Sparkly |
| Bubbly | Fragile | Plastic | Splintery |
| Chewy | Full-bodied | Porous | Spongy |
| Clingy | Gooey | Powdery | Springy |
| Coating | Grainy | Puffy | Sticky |
| Cohesive | Gritty | Pulpy | Stringy |
| Creamy | Gummy | Rich | Syrupy |
| Crisp | Hard | Rough | Tender |
| Crumbly | Heavy | Rubbery | Thick |
| Crusty | Heterogeneous | Runny | Thin |
| Dense | Juicy | Sandy | Tingly |
| Doughy | Lean | Scratchy | Tough |
| Dry | Light | Short | Uniform |
| Elastic | Limp | Silky | Viscous |
| Fatty | Lumpy | Slippery | Watery |
| Firm | Moist | Slivery | Waxy |
| Flaky | Mouth coating | Smooth | Wiggly |

Accelerated attention has been given to structure as it pertains to newer food substances including fabricated and imitation products, formed meat and fish products, where very serious efforts are made by processes to duplicate the properties of the original or other natural food substances. The use of non-traditional raw materials, synthetic flavors, fillers, stretchers, and extenders all tend to alter certain textural characteristics of the finished product. Frequently, the imitation of textural properties is of much greater difficulty in the replication of taste, odors, and colors. Numerous manipulative processes, including extrusion structurization, have been developed to simulate natural structural properties. The processes generally find it prudent to duplicate the properties of the original substances to the extent feasible technically and economically in order to promote early market acceptance. While structure has attributes related to appearance, it also has attributes related to touch and also mouth feel or interaction of food when it comes in contact with the mouth. Frequently, these sensory perceptions involved with chewing can relate to impressions of either desirability or undesirability.

Thus, structural terms include terms relating to the behavior of the material under stress or strain and include, for example, the following: firm, hard, soft, tough, tender, chewy, rubbery, elastic, plastic, sticky, adhesive, tacky, crispy, crunchy, etc. Secondly, structure terms may be related to the structure of the material: smooth, fine, powdery, chalky, lumpy, mealy, coarse, gritty, etc. Third, structure terms may relate to the shape and arrangement of structural elements, such as: flaky, fibrous, stringy, pulpy, cellular, crystalline, glassy, spongy, etc. Last, structure terms may relate to mouth feel characteristics, including: mouth feel, body, dry, moist, wet, watery, waxy, slimy, mushy, etc.

As used herein, "unstructurized" and "structurized" describe the characteristics of the food product as set forth in Table II:

TABLE II

| | Unstructurized Characteristic | Structurized Characteristic |
| --- | --- | --- |
| Behavior of Material under Stress or Strain | sticky gooey plastic | firm chewy |
| Structure of Material | smooth | coarse |
| Shape and Arrangement of Structural Elements | gelatinous pulpy pasty | fibrous crusty |
| Mouth Feel | creamy mushy with body | moist dry |

SUMMARY OF THE INVENTION

One aspect of the invention provides a process for producing a restructured meat composition. The process generally comprises: extruding a plant protein material under conditions of elevated temperature and pressure through a die assembly to form a structured plant protein product having protein fibers that are substantially aligned.

Another aspect of the invention provides a restructured meat composition. The restructured meat composition comprising a structured protein product having protein fibers that are substantially aligned.

FIGURE LEGENDS

DETAILED DESCRIPTION OF THE INVENTION

Figure 1:
FIG. 1 depicts a photographic image of a micrograph showing a structured plant protein product of the invention having protein fibers that are substantially aligned.

The present invention provides hydrated and shredded protein compositions and processes for producing each of the compositions. Typically, the protein composition will comprise animal meat and structured protein products having protein fibers that are substantially aligned. Alternatively, the protein composition will comprise a comminuted vegetable or comminuted fruit and structured protein products having protein fibers that are substantially aligned.

(I) Structured Protein Products

The protein compositions of the invention each comprise structured protein products comprising protein fibers that are substantially aligned, as described in more detail in I(e) below. In an exemplary embodiment, the structured protein products are extrudates of protein material that have been subjected to the extrusion process detailed in I(d) below. Because the structured protein products have protein fibers that are substantially aligned in a manner similar to animal meat, the protein compositions of the invention generally have the texture and eating quality characteristics of compositions comprised of one hundred percent animal meat.

(a) Protein-Containing Materials

A variety of ingredients that contain protein may be utilized in a thermal plastic extrusion process to produce structured protein products suitable for use in the protein compositions herein. While ingredients comprising proteins derived from plants are typically used, it is also envisioned that proteins derived from other sources, such as animal sources, may be utilized without departing from the scope of the invention. For example, a dairy protein selected from the group consisting of casein, caseinates, whey protein, and mixtures thereof may be utilized. In an exemplary embodiment, the dairy protein is whey protein. By way of further example, an egg protein selected from the group consisting of ovalbumin, ovoglobulin, ovomucin, ovomucoid, ovotransferrin, ovovitella, ovovitellin, albumin globulin, and vitellin may be utilized. Further, meat proteins or protein ingredients consisting of collagen, blood, organ meat, mechanically separated meat, partially defatted tissue and blood serum proteins may be included as one or more of the ingredients of the structured protein products.

It is envisioned that other ingredient types in addition to proteins may be utilized. Non-limiting examples of such ingredients include sugars, starches, oligosaccharides, soy fiber and other dietary fibers.

It is also envisioned that the protein-containing materials may be gluten-free. Because gluten is typically used in filament formation during the extrusion process, if a gluten-free starting material is used, an edible cross-linking agent may be utilized to facilitate filament formation. Non-limiting examples of suitable cross-linking agents include Konjac glucomannan (KGM) flour, beta 1,3 glucan (Pureglucan™ or Curdlan manufactured by Takeda-Kirin Foods), transglutaminase, calcium salts, and magnesium salts. One skilled in the art can readily determine the amount of cross-linking material needed, if any, in gluten-free embodiments.

Irrespective of its source or ingredient classification, the ingredients utilized in the extrusion process are typically capable of forming extrudates having protein fibers that are substantially aligned. Suitable examples of such ingredients are detailed more fully below.

(i) Plant Protein Materials

In an exemplary embodiment, at least one ingredient derived from a plant will be utilized to form the protein-containing materials. Generally speaking, the ingredient will comprise a protein. The amount of protein present in the ingredient(s) utilized can and will vary depending upon the application. For example, the amount of protein present in the ingredient(s) utilized may range from about 40% to about 100% by weight. In another embodiment, the amount of protein present in the ingredient(s) utilized may range from about 50% to about 100% by weight. In an additional embodiment, the amount of protein present in the ingredient(s) utilized may range from about 60% to about 100% by weight. In a further embodiment, the amount of protein present in the ingredient(s) utilized may range from about 70% to about 100% by weight. In still another embodiment, the amount of protein present in the ingredient(s) utilized may range from about 80% to about 100% by weight. In a further embodiment, the amount of protein present in the ingredient(s) utilized may range from about 90% to about 100% by weight.

The ingredient(s) utilized in extrusion may be derived from a variety of suitable plants. By way of non-limiting example, suitable plants include legumes, corn, peas, canola, sunflowers, sorghum, rice, amaranth, potato, tapioca, arrowroot, canna, lupin, rape, wheat, oats, rye, barley, and mixtures thereof.

In one embodiment, the ingredients are isolated from wheat and soybeans. In another exemplary embodiment, the ingredients are isolated from soybeans. Suitable wheat derived protein-containing ingredients include wheat gluten, wheat flour, and mixtures thereof. Examples of commercially available wheat gluten that may be utilized in the invention include Gem of the Star Gluten, Vital Wheat Gluten (organic) each of which is available from Manildra Milling. Suitable soybean derived protein-containing ingredients ("soy protein material") include soybean protein isolate, soy protein concentrate, soy flour, and mixtures thereof, each of which are detailed below. Suitable corn derived protein-containing ingredients include corn gluten meal, for example, zein. In each of the foregoing embodiments, the soybean material may be combined with one or more ingredients selected from the group consisting of a starch, flour, gluten, a dietary fiber, and mixtures thereof.

Suitable examples of protein-containing material isolated from a variety of sources are detailed in Table III, which shows various combinations.

TABLE III

| Protein Combinations | |
|---|---|
| First Protein Source | Second Ingredient |
| soybean | wheat |
| soybean | dairy |
| soybean | egg |
| soybean | corn |
| soybean | rice |

TABLE III-continued

Protein Combinations

| First Protein Source | Second Ingredient |
|---|---|
| soybean | barley |
| soybean | sorghum |
| soybean | oat |
| soybean | millet |
| soybean | rye |
| soybean | triticale |
| soybean | buckwheat |
| soybean | pea |
| soybean | peanut |
| soybean | lentil |
| soybean | lupin |
| soybean | channa(garbonzo) |
| soybean | rapeseed (canola) |
| soybean | cassava |
| soybean | sunflower |
| soybean | whey |
| soybean | tapioca |
| soybean | arrowroot |
| soybean | amaranth |
| soybean | wheat and dairy |
| soybean | wheat and egg |
| soybean | wheat and corn |
| soybean | wheat and rice |
| soybean | wheat and barley |
| soybean | wheat and sorghum |
| soybean | wheat and oat |
| soybean | wheat and millet |
| soybean | wheat and rye |
| soybean | wheat and triticale |
| soybean | wheat and buckwheat |
| soybean | wheat and pea |
| soybean | wheat and peanut |
| soybean | wheat and lentil |
| soybean | wheat and lupin |
| soybean | wheat and channa (garbonzo) |
| soybean | wheat and rapeseed (canola) |
| soybean | wheat and cassava |
| soybean | wheat and sunflower |
| soybean | wheat and potato |
| soybean | wheat and tapioca |
| soybean | wheat and arrowroot |
| soybean | wheat and amaranth |
| soybean | corn and wheat |
| soybean | corn and dairy |
| soybean | corn and egg |
| soybean | corn and rice |
| soybean | corn and barley |
| soybean | corn and sorghum |
| soybean | corn and oat |
| soybean | corn and millet |
| soybean | corn and rye |
| soybean | corn and triticale |
| soybean | corn and buckwheat |
| soybean | corn and pea |
| soybean | corn and peanut |
| soybean | corn and lentil |
| soybean | corn and lupin |
| soybean | corn and channa (garbonzo) |
| soybean | corn and rapeseed (canola) |
| soybean | corn and cassava |
| soybean | corn and sunflower |
| soybean | corn and potato |
| soybean | corn and tapioca |
| soybean | corn and arrowroot |
| soybean | corn and amaranth |

In each of the embodiments delineated in Table III, the combination of protein-containing materials may be combined with one or more ingredients selected from the group consisting of a starch, flour, gluten, a dietary fiber, and mixtures thereof. In one embodiment, the protein-containing material comprises protein, starch, gluten, and fiber. In an exemplary embodiment, the protein-containing material comprises from about 45% to about 65% soy protein on a dry matter basis; from about 20% to about 30% wheat gluten on a dry matter basis; from about 10% to about 15% wheat starch on a dry matter basis; and from about 1% to about 5% fiber on a dry matter basis. In each of the foregoing embodiments, the protein-containing material may comprise dicalcium phosphate, L-cysteine or combinations of both dicalcium phosphate and L-cysteine.

(ii). Soy Protein Materials

In an exemplary embodiment, as detailed above, soy protein isolate, soy protein concentrate, soy flour, and mixtures thereof may be utilized in the extrusion process. The soy protein materials may be derived from whole soybeans in accordance with methods generally known in the art. The whole soybean may be standard soybeans (i.e., non genetically modified soybeans), commoditized soybeans, genetically modified soybeans, and combinations thereof.

Generally speaking, when soy isolate is used, an isolate is preferably selected that is not a highly hydrolyzed soy protein isolate. In certain embodiments, highly hydrolyzed soy protein isolates, however, may be used in combination with other soy protein isolates provided that the highly hydrolyzed soy protein isolate content of the combined soy protein isolates is generally less than about 40% of the combined soy protein isolates, by weight. Additionally, the soy protein isolate utilized preferably has an emulsion strength and gel strength sufficient to enable the protein in the isolate to form fibers that are substantially aligned upon extrusion. Examples of soy protein isolates that are useful in the present invention are commercially available, for example, from Solae, LLC (St. Louis, Mo.), and include SUPRO® 500E, SUPRO® EX 33, SUPRO® 620, SUPRO® 630, and SUPRO® 545. In an exemplary embodiment, a form of SUPRO® 620 is utilized as detailed in Example 3.

Alternatively, soy protein concentrate may be blended with the soy protein isolate to substitute for a portion of the soy protein isolate as a source of soy protein material. Typically, if a soy protein concentrate is substituted for a portion of the soy protein isolate, the soy protein concentrate is substituted for up to about 40% of the soy protein isolate by weight, at most, and more preferably is substituted for up to about 30% of the soy protein isolate by weight. Examples of suitable soy protein concentrates useful in the invention include Promine DSPC, Procon, Alpha 12 and Alpha 5800, which are commercially available from Solae, LLC (St. Louis, Mo.).

Soy cotyledon fiber may optionally be utilized as a fiber source. Typically, suitable soy cotyledon fiber will generally effectively bind water when the mixture of soy protein and soy cotyledon fiber is co-extruded. In this context, "effectively bind water" generally means that the soy cotyledon fiber has a water holding capacity of at least 5.0 to about 8.0 grams of water per gram of soy cotyledon fiber, and preferably the soy cotyledon fiber has a water holding capacity of at least about 6.0 to about 8.0 grams of water per gram of soy cotyledon fiber. Soy cotyledon fiber may generally be present in the soy protein material in an amount ranging from about 1% to about 20%, preferably from about 1.5% to about 20% and most preferably, at from about 2% to about 5% by weight on a moisture free basis. Suitable soy cotyledon fiber is commercially available. For example, FIBRIM® 1260 and FIBRIM® 2000 are soy cotyledon fiber materials that are commercially available from Solae, LLC (St. Louis, Mo.).

(b) Additional Ingredients

A variety of additional ingredients may be added to any of the protein-containing materials detailed above without departing from the scope of the invention. For example, antioxidants, antimicrobial agents, and combinations thereof may be included. Antioxidant additives include BHA, BHT, TBHQ, vitamins A, C and E and derivatives thereof. Additionally, various plant extracts such as those containing carotenoids, tocopherols or flavonoids having antioxidant properties, may be included to increase the shelf-life or nutritionally enhance the protein compositions. The antioxidants and the antimicrobial agents may have a combined presence at levels of from about 0.01% to about 10%, preferably, from about 0.05% to about 5%, and more preferably from about 0.1% to about 2%, by weight of the protein-containing materials.

(c) Moisture Content

As will be appreciated by the skilled artisan, the moisture content of the protein-containing materials and optional additional ingredients can and will vary. The purpose of the water is to hydrate the ingredients of the protein composition. Generally speaking, the moisture content may range from about 1% to about 80% by weight. In low moisture extrusion applications, the moisture content of the protein-containing materials may range from about 1% to about 35% by weight. Alternatively, in high moisture extrusion applications, the moisture content of the protein-containing materials may range from about 35% to about 80% by weight. In an exemplary embodiment, the extrusion application utilized to form the extrudates is low moisture. An exemplary example of a low moisture extrusion process to produce extrudates having proteins with fibers that are substantially aligned is detailed in I(d) and Example 3.

(d) Extrusion of the Protein-Containing Material

A suitable extrusion process for the preparation of structured protein products comprises introducing the protein material, and other ingredients into a mixing vessel (i.e., an ingredient blender) to combine the ingredients and form a dry blended protein material pre-mix. The dry blended protein material pre-mix may be transferred to a hopper from which the dry blended ingredients are introduced along with moisture into a pre-conditioner to form a conditioned protein material mixture. The conditioned material is then fed to an extruder in which the mixture is heated under mechanical pressure generated by the screws of the extruder to form a molten extrusion mass. Alternatively, the dry blended protein material pre-mix may be directly fed to an extruder in which moisture and heat are introduced to form a molten extrusion mass. The molten extrusion mass exits the extruder through an extrusion die assembly forming an extrudate comprising structured protein products having protein fibers that are substantially aligned.

(i) Extrusion Process Conditions

Among the suitable extrusion apparatuses useful in the practice of the present invention is a double barrel, twin-screw extruder as described, for example, in U.S. Pat. No. 4,600,311. Further examples of suitable commercially available extrusion apparatuses include a CLEXTRAL Model BC-72 extruder manufactured by Clextral, Inc. (Tampa, Fla.); a WENGER Model TX-57 extruder, a WENGER Model TX-168 extruder, and a WENGER Model TX-52 extruder all manufactured by Wenger Manufacturing, Inc. (Sabetha, Kans.). Other conventional extruders suitable for use in this invention are described, for example, in U.S. Pat. Nos. 4,763,569, 4,118,164, and 3,117,006, which are hereby incorporated by reference in their entirety.

The screws of a twin-screw extruder can rotate within the barrel in the same or opposite directions. Rotation of the screws in the same direction is referred to as single flow whereas rotation of the screws in opposite directions is referred to as double flow. The speed of the screw or screws of the extruder may vary depending on the particular apparatus; however, it is typically from about 250 to about 400 revolutions per minute (rpm). Generally, as the screw speed increases, the density of the extrudate will decrease. The extrusion apparatus contains screws assembled from shafts and worm segments, as well as mixing lobe and ring-type shearlock elements as recommended by the extrusion apparatus manufacturer for extruding plant protein material.

The extrusion apparatus generally comprises a plurality of temperature controlled zones through which the protein mixture is conveyed under mechanical pressure prior to exiting the extrusion apparatus through an extrusion die assembly. The temperature in each successive heating zone generally exceeds the temperature of the previous heating zone by between about 110° C. and about 70° C. In one embodiment, the conditioned pre-mix is transferred through four heating zones within the extrusion apparatus, with the protein mixture heated to a temperature of from about 100° C. to about 150° C. such that the molten extrusion mass enters the extrusion die assembly at a temperature of from about 100° C. to about 150° C.

The barrel pressure is dependent on numerous factors including, for example, the extruder screw speed, feed rate of the mixture to the barrel, feed rate of water to the barrel, and the viscosity of the molten mass within the barrel.

Water may be injected into the extruder barrel to hydrate the plant protein material mixture and promote texturization of the proteins. As an aid in forming the molten extrusion mass, the water may act as a plasticizing agent. Water may be introduced to the extruder barrel via one or more injection jets in communication with a heating zone. Typically, the mixture in the barrel contains from about 1% to about 30% by weight water. In one embodiment, the mixture in the barrel contains from about 5% to about 20% by weight water. The rate of introduction of water to any of the heating zones is generally controlled to promote production of an extrudate having desired characteristics. It has been observed that as the rate of introduction of water to the barrel decreases, the density of the extrudate decreases.

(ii) Optional Preconditioning

In a pre-conditioner, the protein-containing material and optional additional ingredients (protein-containing mixture) are preheated, contacted with moisture, and held under temperature and pressure conditions to allow the moisture to penetrate and soften the individual particles. The preconditioning step increases the bulk density of the particulate fibrous material mixture and improves its flow characteristics. The preconditioner contains one or more paddles to promote uniform mixing of the protein and transfer of the protein mixture through the preconditioner. The configuration and rotational speed of the paddles vary widely, depending on the capacity of the preconditioner, the extruder throughput and/or the desired residence time of the mixture in the preconditioner or extruder barrel. Generally, the speed of the paddles is from about 500 to about 1300 revolutions per minute (rpm).

Typically, the protein-containing mixture is pre-conditioned prior to introduction into the extrusion apparatus by contacting the pre-mix with moisture (i.e., steam and/or water). Preferably the protein-containing mixture is heated to a temperature of from about 20° C. to about 60° C., more preferably from about 30° C. to about 45° C. in the preconditioner.

Typically, the protein-containing pre-mix is conditioned for a period of about 0.5 minutes to about 10.0 minutes, depending on the speed and the size of the pre-conditioner. In an exemplary embodiment, the protein-containing pre-mix is conditioned for a period of about 3.0 minutes to about 5.0 minutes. The pre-mix is contacted with steam and/or water and heated in the pre-conditioner at generally constant steam flow to achieve the desired temperatures. The water and/or steam conditions (i.e., hydrates) the pre-mix, increases its density, and facilitates the flowability of the dried mix without interference prior to introduction to the extruder barrel where the proteins are texturized. If low moisture pre-mix is desired, the conditioned pre-mix may contain from about 1% to about 35% (by weight) water. If high moisture pre-mix is desired, the conditioned pre-mix may contain from about 35% to about 80% (by weight) water.

The conditioned pre-mix typically has a bulk density of from about 0.25 g/cm$^3$ to about 0.60 g/cm$^3$. Generally, as the bulk density of the pre-conditioned protein mixture increases within this range, the protein mixture is easier to process. This is presently believed to be due to such mixtures occupying all or a majority of the space between the screws of the extruder, thereby facilitating conveying the extrusion mass through the barrel.

(iii) Extrusion Process

The dry pre-mix or the conditioned pre-mix is then fed into an extruder to heat, shear, and ultimately plasticize the mixture. The extruder may be selected from any commercially available extruder and may be a single screw extruder or preferably a twin-screw extruder that mechanically shears the mixture with the screw elements.

The rate at which the pre-mix is generally introduced to the extrusion apparatus will vary depending upon the particular apparatus. Generally, the pre-mix is introduced at a rate of no more than about 25 kilograms per minute. Generally, it has been observed that the density of the extrudate decreases as the feed rate of pre-mix to the extruder increases.

The pre-mix is subjected to shear and pressure by the extruder to plasticize the mixture. The screw elements of the extruder shear the mixture as well as create pressure in the extruder by forcing the mixture forwards though the extruder and through the die assembly. The screw motor speed determines the amount of shear and pressure applied to the mixture by the screw(s). Preferably, the screw motor speed is set to a speed of from about 200 rpm to about 500 rpm, and more preferably from about 300 rpm to about 400 rpm, which moves the mixture through the extruder at a rate of at least about 20 kilograms per hour and more preferably at least about 40 kilograms per hour. Preferably the extruder generates an extruder barrel exit pressure of from about 500 to about 1500 psig, and more preferably an extruder barrel exit pressure of from about 600 to about 1000 psig is generated.

The extruder heats the mixture as it passes through the extruder denaturing the protein in the mixture. The extruder includes a means for heating and/or cooling the mixture to temperatures of from about 100° C. to about 180° C. Preferably, the means for heating or cooling the mixture in the extruder comprises extruder barrel jackets into which heating or cooling media such as steam or water may be introduced to control the temperature of the mixture passing through the extruder. The extruder may also include steam injection ports for directly injecting steam into the mixture within the extruder. The extruder preferably includes multiple heating zones that can be controlled to independent temperatures, where the temperatures of the heating zones are preferably set to increase the temperature of the mixture as it proceeds through the extruder. In one embodiment, the extruder may be set in a four temperature zone arrangement, where the first zone (adjacent the extruder inlet port) is set to a temperature of from about 80° C. to about 100° C., the second zone is set to a temperature of from about 100° C. to 135° C., the third zone is set to a temperature of from 135° C. to about 150° C., and the fourth zone (adjacent the extruder exit port) is set to a temperature of from 150° C. to 180° C. The extruder may be set in other temperature zone arrangements, as desired. In another embodiment, the extruder may be set in a five temperature zone arrangement, where the first zone is set to a temperature of about 25° C., the second zone is set to a temperature of about 50° C., the third zone is set to a temperature of about 95° C., the fourth zone is set to a temperature of about 130° C., and the fifth zone is set to a temperature of about 150° C. In still another embodiment, the extruder may be set in a six temperature zone arrangement, where the first zone is set to a temperature of about 90° C., the second zone is set to a temperature of about 100° C., the third zone is set to a temperature of about 105° C., the fourth zone is set to a temperature of about 100° C., the fifth zone is set to a temperature of about 120° C., and the sixth zone is set to a temperature of about 130° C.

The mixture forms a melted plasticized mass in the extruder. A die assembly is attached to the extruder in an arrangement that permits the plasticized mixture to flow from the extruder exit port into the die assembly and produces substantial alignment of the protein fibers within the plasticized mixture as it flows through the die assembly. The die assembly may include either a faceplate die or a peripheral die. The cutter speed is set to size the piece to no more than 5% through a 16 mesh screen, and no more than 65% on a 12-inch screen.

Figure 3:
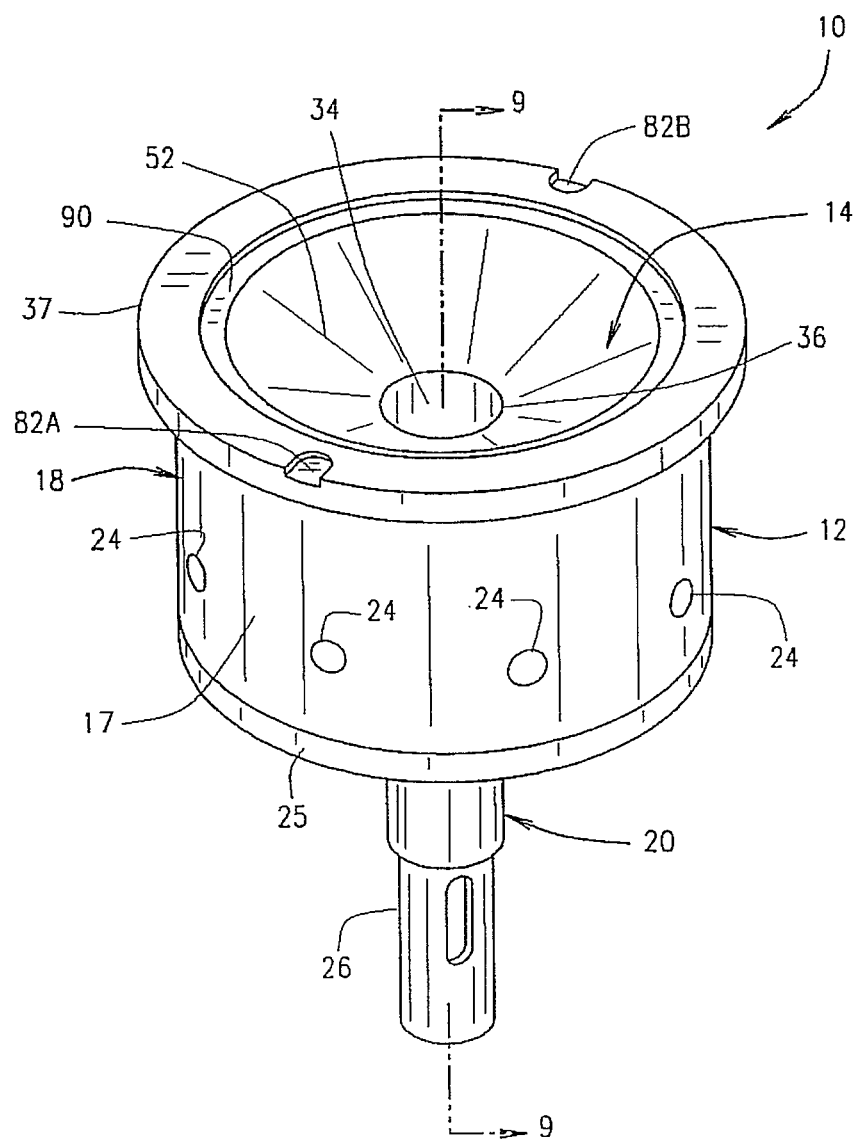
FIG. 3 depicts a perspective view of a peripheral die assembly that may be used in the extrusion process of the protein containing materials.
Figure 4:
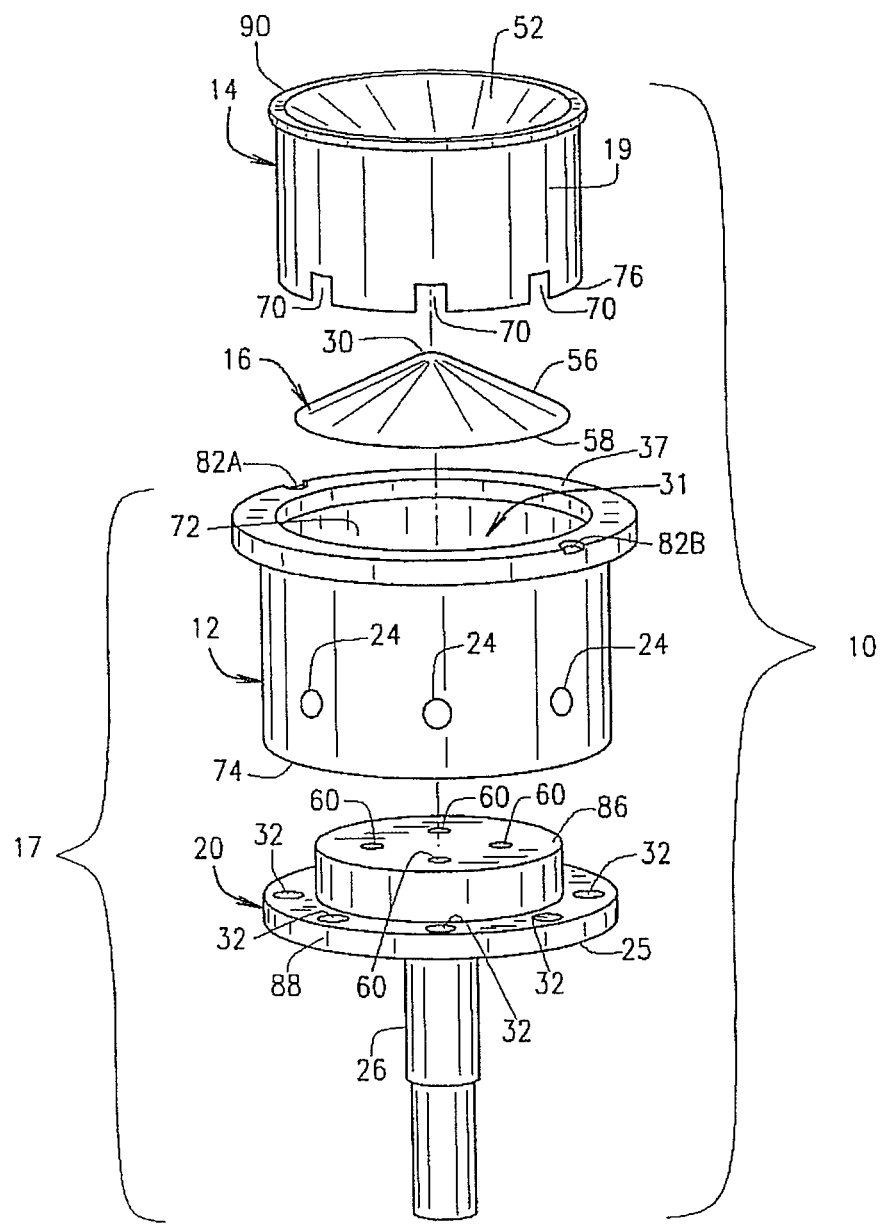
FIG. 4 depicts an exploded view of the peripheral die assembly of FIG. 3 showing the die insert, die sleeve and die cone.
Figures 5, 5A:
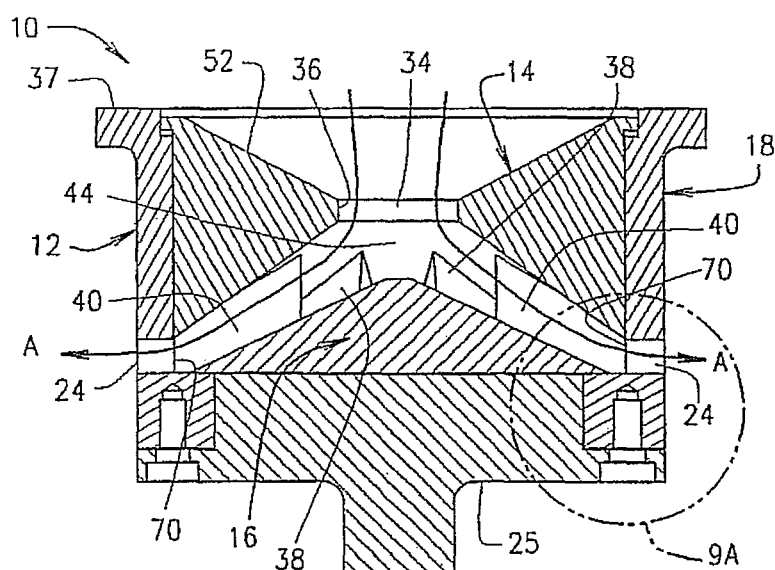
FIG. 5 depicts a cross-sectional view taken along line 9-9 of FIG. 3 showing a flow channel defined between the die sleeve, die insert, and die cone arrangement.
FIG. 5A depicts an enlarged cross-sectional view of FIG. 5 showing the interface between the flow channel and the outlet of the die sleeve.

One embodiment includes a peripheral die assembly as illustrated and generally indicated as 10 in FIGS. 3-5.

As shown in FIGS. 3 and 4, the peripheral die assembly 10 may include a die sleeve 12 having a cylindrical-shaped two-part sleeve die body 17. The sleeve die body 17 may include a rear portion 18 coupled to a front portion 20 that collectively define an internal chamber 31 in communication with opposing openings 72, 74. The die sleeve 12 may be adapted to receive a die insert 14 and a die cone 16 for providing the necessary structural elements to facilitate laminar flow of the plasticized mixture through the peripheral die assembly 10 during the extrusion process.

Additionally, the front portion 20 of the die sleeve 12 may be secured to a die cone 16 adapted to interface with the die insert 14 when the front portion 20 is secured to the rear portion 18 of the die sleeve 12 during assembly of the peripheral die assembly 10. As further shown, the rear portion 18 of die sleeve 12 defines a plurality of circular-shaped outlets 24 along the sleeve body 17 which are adapted to provide a conduit for the egress of the extrudate from the peripheral die assembly 10 during the extrusion process. In the alternative, the plurality of outlets 24 may have different configurations, such as square, rectangular, scalloped or irregular. As further shown, the rear portion 18 of the die sleeve 12 may include a circular flange 37 that surrounds opening 72 and defines a pair of opposing slots 82A and 82B that are used to properly align the die sleeve 12 when engaging the die sleeve 12 to the extruder.

As shown in FIG. 5, when the peripheral die assembly 10 is fully assembled the die insert 14 is disposed within the rear portion 18 of the die sleeve 12 which is secured to the front portion 20 of the die sleeve 12 such that the conical side 56 of the die cone 16 is oriented toward the chamber 31 and encased between the rear and front portions 18 and 20. In this orientation, the conical side 56 is operatively associated with the front face 27 of the die insert 14. As such, the opposing side walls 50 of each adjacent flow diverter 38, the bottom portion 64 of the die insert 14, and the conical side 56 of the die cone 16 collectively define a respective flow channel 40 in communication with a respective outlet 24. The flow channel 40 defined between the die sleeve 12, die insert 14 and die cone 16 as described above may be tapered on all four sides of the flow channel 40. Accordingly, the flow channel 40 gradually tapers inwardly on all four sides from the entrance 84 to the outlet 24 of each flow channel 40.

Referring to FIG. 5A, an enlarged view illustrating the flow pathway "A" through flow channel 40 is shown. Specifically, flow channel 40 communicates with the outlet 24 through opening 70 defined by the die insert 14.

During the extrusion process, the peripheral die assembly 10 is operatively engaged with the extruder and produces a plasticized mixture that contacts the well 52 defined by the rear face 29 of the die insert 14 and flows into the throat 34 and enters the inner space opening 36 as indicated by flow path "A". The plasticized mixture may enter the inner space 44 defined by the die insert 14 and enter the entrance 84 of each tapered flow channel 42. The plasticized mixture then flows through each flow channel 42 and exits from a respective outlet 24 in a manner that causes the substantial alignment of the protein fibers in the extrudate produced by the peripheral die assembly 10.

The width and height dimensions of the outlet(s) 24 are selected and set prior to extrusion of the mixture to provide the fibrous material extrudate with the desired dimensions. The width of the outlet(s) 24 may be set so that the extrudate resembles from a cubic chunk of meat to a steak filet, where widening the width of the outlet(s) 24 decreases the cubic chunk-like nature of the extrudate and increases the filet-like nature of the extrudate. In an exemplary embodiment, the width of the outlet(s) 24 may be set to a width of from about 10 millimeters to about 40 millimeters.

The height dimension of the outlet(s) 24 may be set to provide the desired thickness of the extrudate. The height of the outlet(s) 24 may be set to provide a very thin extrudate or a thick extrudate. For example, the height of the outlet(s) 24 may be set to from about 1 millimeter to about 30 millimeters. In an exemplary embodiment, the height of the outlet(s) 24 may be set to from about 8 millimeters to about 16 millimeters.

It is also contemplated that the outlet(s) 24 may be round. The diameter of the outlet(s) 24 may be set to provide the desired thickness of the extrudate. The diameter of the outlet(s) 24 may be set to provide a very thin extrudate or a thick extrudate. For example, the diameter of the outlet(s) 24 may be set to from about 1 millimeter to about 30 millimeters. In an exemplary embodiment, the diameter of the outlet(s) 24 may be set to from about 8 millimeters to about 16 millimeters.

Other peripheral die assemblies suitable for use in this invention are described in U.S. Pat. App. No. 60/882,662, which is hereby incorporated by reference in its entirety.

The extrudate is cut after exiting the die assembly. Suitable apparatuses for cutting the extrudate include flexible knives manufactured by Wenger Manufacturing, Inc. (Sabetha, Kans.) and Clextral, Inc. (Tampa, Fla.). Typically, the speed of the cutting apparatus is from about 1000 rpm to about 2500 rpm. In an exemplary embodiment, the speed of the cutting apparatus is about 1600 rpm.

A dryer, if one is used, generally comprises a plurality of drying zones in which the air temperature may vary. Generally, the temperature of the air within one or more of the zones will be from about 100° C. to about 185° C. Typically, the extrudate is present in the dryer for a time sufficient to provide an extrudate having the desired moisture content. Generally, the extrudate is dried for at least about 5 minutes and more generally, for at least about 10 minutes. Alternatively, the extrudate may be dried at lower temperatures, such as about 70° C., for longer periods of time. Suitable dryers include those manufactured by Wolverine Proctor & Schwartz (Merrimac, Mass.), National Drying Machinery Co. (Philadelphia, Pa.), Wenger (Sabetha, Kans.), Clextral (Tampa, Fla.), and Buehler (Lake Bluff, Ill.).

The desired moisture content may vary widely depending on the intended application of the extrudate. Generally speaking, the extruded material has a moisture content of from about 6% to about 13% by weight, if dried, and needs to be hydrated in water until the water is absorbed and the fibers are separated. If the protein material is not dried or not fully dried, its moisture content is higher, generally from about 16% to about 30% by weight.

The dried extrudate may further be comminuted to reduce the average particle size of the extrudate. Suitable grinding apparatus include hammer mills such as Mikro Hammer Mills manufactured by Hosokawa Micron Ltd. (England).

(e) Characterization of the Structured Protein Products

The extrudates produced in I(d) typically comprise the structured protein products having protein fibers that are substantially aligned. In the context of this invention "substantially aligned" generally refers to the arrangement of protein fibers such that a significantly high percentage of the protein fibers forming the structured protein product are contiguous to each other at less than approximately a 45° angle when viewed in a horizontal plane. Typically, an average of at least 55% of the protein fibers comprising the structured protein product are substantially aligned. In another embodiment, an average of at least 60% of the protein fibers comprising the structured protein product are substantially aligned. In a further embodiment, an average of at least 70% of the protein fibers comprising the structured protein product are substantially aligned. In an additional embodiment, an average of at least 80% of the protein fibers comprising the structured protein product are substantially aligned. In yet another embodiment, an average of at least 90% of the protein fibers comprising the structured protein product are substantially aligned. Methods for determining the degree of protein fiber alignment are known in the art and include visual determinations based upon micrographic images.

Figure 2:
FIG. 2 depicts a photographic image of a micrograph showing a plant protein product not produced by the process of the present invention. The protein fibers comprising the plant protein product, as described herein, are crosshatched.

By way of example, FIGS. 1 and 2 depict micrographic images that illustrate the difference between a structured protein product having substantially aligned protein fibers compared to a protein product having protein fibers that are significantly crosshatched. FIG. 1 depicts a structured protein product prepared according to I(a)-I(d) having protein fibers that are substantially aligned. Contrastingly, FIG. 2 depicts a protein product containing protein fibers that are significantly crosshatched and not substantially aligned. Because the protein fibers are substantially aligned, as shown in FIG. 1, the structured protein products utilized in the invention generally have the texture and consistency of cooked muscle meat. In contrast, extrudates having protein fibers that are randomly oriented or crosshatched generally have a texture that is soft or spongy.

In addition to having protein fibers that are substantially aligned, the structured protein products also typically have shear strength substantially similar to whole meat muscle. In this context of the invention, the term "shear strength" provides one means to quantify the formation of a sufficient fibrous network to impart whole-muscle like texture and appearance to the structured protein product. Shear strength is the maximum force in grams needed to shear through a given sample. A method for measuring shear strength is described in Example 1.

Generally speaking, the structured protein products of the invention will have average shear strength of at least 1400 grams. In an additional embodiment, the structured protein products will have average shear strength of from about 1500 to about 1800 grams. In yet another embodiment, the structured protein products will have average shear strength of from about 1800 to about 2000 grams. In a further embodiment, the structured protein products will have average shear strength of from about 2000 to about 2600 grams. In an additional embodiment, the structured protein products will have average shear strength of at least 2200 grams. In a further embodiment, the structured protein products will have average shear strength of at least 2300 grams. In yet another embodiment, the structured protein products will have average shear strength of at least 2400 grams. In still another embodiment, the structured protein products will have average shear strength of at least 2500 grams. In a further embodiment, the structured protein products will have average shear strength of at least 2600 grams.

A means to quantify the size of the protein fibers formed in the structured protein products may be done by a shred characterization test. Shred characterization is a test that generally determines the percentage of large pieces formed in the structured protein product. In an indirect manner, percentage of shred characterization provides an additional means to quantify the degree of protein fiber alignment in a structured protein product. Generally speaking, as the percentage of large pieces increases, the degree of protein fibers that are aligned within a structured protein product also typically increases. Conversely, as the percentage of large pieces decreases, the degree of protein fibers that are aligned within a structured protein product also typically decreases.

A method for determining shred characterization is detailed in Example 2. The structured protein products of the invention typically have an average shred characterization of at least 10% by weight of large pieces. In a further embodiment, the structured protein products have an average shred characterization of from about 10% to about 15% by weight of large pieces. In another embodiment, the structured protein products have an average shred characterization of from about 15% to about 20% by weight of large pieces. In yet another embodiment, the structured protein products have an average shred characterization of from about 20% to about 25% by weight of large pieces. In another embodiment, the average shred characterization is at least 20% by weight, at least 21% by weight, at least 22% by weight, at least 23% by weight, at least 24% by weight, at least 25% by weight, or at least 26% by weight large pieces.

Suitable structured protein products of the invention generally have protein fibers that are substantially aligned, have average shear strength of at least 1400 grams, and have an average shred characterization of at least 10% by weight large pieces. More typically, the structured protein products will have protein fibers that are at least 55% aligned, have average shear strength of at least 1800 grams, and have an average shred characterization of at least 15% by weight large pieces. In exemplary embodiment, the structured protein products will have protein fibers that are at least 55% aligned, have average shear strength of at least 2000 grams, and have an average shred characterization of at least 17% by weight large pieces. In another exemplary embodiment, the structured protein products will have protein fibers that are at least 55% aligned, have average shear strength of at least 2200 grams, and have an average shred characterization of at least 20% by weight large pieces.

(II) Restructured Meat Compositions

The structured protein products are utilized in the invention as a component in restructured meat compositions. A restructured meat composition may comprise a mixture of animal meat and structured protein product, or it may comprise no meat and primarily structured protein product. The process for producing the restructured meat compositions generally comprises optionally mixing it with animal meat, coloring and hydrating the structured protein product, reducing its particle size, and further processing the composition into a food product comprising meat.

(a) Optionally Blend with Animal Meat

The structured protein product may optionally be blended with animal meat to produce animal meat compositions either before or after contacting the structured protein product with the coloring composition detailed below. In general, the structured protein product will be blended with animal meat that has a similar particle size.

It is well known in the art to produce mechanically deboned or separated raw meats using high-pressure machinery that separates bone from animal tissue, by first crushing bone and adhering animal tissue and then forcing the animal tissue, and not the bone, through a sieve or similar screening device. The animal tissue in the present invention comprises muscle tissue, organ tissue, connective tissue and skin. The process forms an unstructured, paste-like blend of soft animal tissue with a batter-like consistency and is commonly referred to as mechanically deboned meat or MDM. This paste-like blend has a particle size of from about 0.25 to about 15 millimeters, preferably up to about 5 millimeters and most preferably up to about 3 millimeters.

Although the animal tissue, also known as raw meat, is preferably provided in at least substantially frozen form so as to avoid microbial spoilage prior to processing, once the meat is ground, it is not necessary to freeze it to provide cutability into individual strips or pieces. Unlike meat meal, raw meat has a natural high moisture content with a ratio of protein to moisture of from about 1:3.6 to 1:3.7.

The raw meat used in the present invention may be any edible meat suitable for consumption. The meat may be non-rendered, non-dried, raw meat, raw meat products, raw meat by-products, and mixtures thereof. The meat or meat products are comminuted and generally supplied daily in a completely frozen or at least substantially frozen condition so as to avoid microbial spoilage. Generally the temperature of the comminuted meat is below about 40° C. (104° F.), preferably below about 10° C. (50° F.) more preferably is from about −4° C. (25° F.) to about 6° C. (43° F.) and most preferably from about −2° C. (28° F.) to about 2° C. (36° F.). While refrigerated or chilled meat may be used, it is generally impractical to store large quantities of unfrozen meat for extended periods of time at a plant site. The frozen products provide a longer lay time than do the refrigerated or chilled products.

In lieu of frozen comminuted meat, the comminuted meat may be freshly prepared for the preparation of the restructured meat product, as long as the freshly prepared comminuted meat meets the temperature conditions of not more than about 40° C. (104° F.).

The moisture content of the raw frozen or unfrozen meat is generally at least about 50% by weight, and most often from about 60% by weight to about 75% by weight, based upon the weight of the raw meat. In one embodiment of the invention, the fat content of the raw frozen or unfrozen meat is at least 2% by weight. Generally the fat content of the raw frozen or unfrozen meat is from about 3% by weight to about 95% by weight. In another embodiment, the fat content of the raw frozen or unfrozen meat is about 20% by weight to about 95% by weight. In other embodiments of the invention, meat products may be combined to produce a meat composition that has a fat content of from about 15% by weight to about 30% by weight. In another embodiment, the meat composition may have a fat content of less than about 10% by weight and defatted meat products may be used.

The frozen or chilled meat may be stored at a temperature of about −18° C. (0.4° F.) to about 0° C. (32° F.). It is generally supplied in 20 kilogram blocks. Upon use, the blocks are permitted to thaw up to about 10° C. (50° F.), that is, to defrost, but in a tempered environment.

Thus, the outer layer of the blocks, for example up to a depth of about ¼", may be defrosted or thawed but still at a temperature of about 0° C. (32° F.), while the remaining inner portion of the blocks, while still frozen, are continuing to thaw and thus keeping the outer portion at below about 10° C. (50° F.).

A variety of animal meats are suitable for use in the restructured meat composition. For example, the meat may be from a farm animal selected from the group consisting of sheep, cattle, goats, pork, bison, and horses. The animal meat may be from poultry, such as chicken, duck, goose or turkey. Alternatively, the animal meat may be from a game animal. Non-limiting examples of suitable game animals include buffalo, deer, elk, moose, reindeer, caribou, antelope, rabbit, squirrel, beaver, muskrat, opossum, raccoon, armadillo, porcupine, alligator, and snake. In a further embodiment, the animal meat may be from a fish or shellfish. Non-limiting examples of suitable fish or fish products include saltwater and freshwater fish, such as, catfish, tuna, salmon, bass, mackerel, pollack, hake, tilapia, cod, grouper, whitefish, bowfin, gar, paddlefish, sturgeon, bream, carp, trout, surimi, walleye, snakehead, and shark. In an exemplary embodiment, the animal meat is from beef, pork, or turkey.

Meat includes striated muscle which is skeletal or that which is found, for example, in the tongue, diaphragm, heart, or esophagus, with or without accompanying overlying fat and portions of the skin, sinew, nerve and blood vessels which normally accompany the meat flesh. Examples of meat by-products are organs and tissues such as lungs, spleens, kidneys, brain, liver, blood, bone, partially defatted low-temperature fatty tissues, stomachs, intestines free of their contents, and the like.

The term "meat by-products" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated.

Typically, the amount of structured protein product in relation to the amount of animal meat in the animal meat compositions can and will vary depending upon the composition's intended use. By way of example, when a significantly vegetarian composition that has a relatively small degree of animal flavor is desired, the concentration of animal meat in the restructured meat composition may be about 45%, 40%, 35%, 30%, 25%, 20%, 15%, 10%, 5%, 2%, or 0% by weight. Alternatively, when a restructured meat composition having a relatively high degree of animal meat flavor is desired, the concentration of animal meat in the restructured meat composition may be about 50%, 55%, 60%, 65%, 70%, 75%, 80%, 85%, 90% or 95% by weight. Consequently, the concentration of hydrated structured plant protein product in the restructured meat composition may be about 5%, 10%, 15%, 20%, 25%, 30%, 35%, 40%, 45%, 50%, 55%, 60%, 65%, 70%, 75%, 80%, 85%, 90%, 95%, or 99% by weight. In an exemplary embodiment, the restructured meat composition will generally have from about 40% to about 60% by weight of the hydrated structured protein product and from about 40% to about 60% by weight of animal meat.

It is also envisioned that a variety of meat qualities may be utilized in the invention. For example, whole meat muscle that is either ground or in chunk or steak form may be utilized. The meat may have a fat content that varies widely.

(b) Optionally Blend with Comminuted Vegetable or Comminuted Fruit

The structured protein product may optionally be blended with comminuted vegetable or comminuted fruit to produce restructured meat compositions either before or after contacting the structured protein product with the coloring composition detailed below. In general, the structured protein product will be blended with comminuted vegetable or comminuted fruit that has a similar particle size.

A variety of vegetables or fruits are suitable for use in the restructured meat composition. Typically, the amount of structured protein product in relation to the amount of comminuted vegetable or comminuted fruit in the restructured meat compositions can and will vary depending upon the composition's intended use. By way of example, the concentration of comminuted vegetable or comminuted fruit in the restructured meat composition may be about 95%, 90%, 85%, 80%, 75%, 70%, 65%, 60%, 55%, 50%, 45%, 40%, 35%, 30%, 25%, 20%, 15%, 10%, 5%, 2%, or 0% by weight. Consequently, the concentration of hydrated structured plant protein product in the restructured meat composition may be about 5%, 10%, 15%, 20%, 25%, 30%, 35%, 40%, 45%, 50%, 55%, 60%, 65%, 70%, 75%, 80%, 85%, 90%, 95%, or 99% by weight. In an exemplary embodiment, the restructured meat composition will generally have from about 40% to about 60% by weight of the hydrated structured protein product and from about 40% to about 60% by weight of comminuted vegetable or comminuted fruit.

(c) Hydrating and Coloring the Structured Protein Product

The structured protein product is generally colored with a coloring composition so as to resemble raw meat and/or cooked meat. The coloring compositions of the invention may comprise thermally unstable pigments, thermally stable pigments, and browning agents. The choice of the type of pigments and the amount present in the coloring composition can and will vary depending upon the desired color of the restructured meat composition. When the restructured meat composition simulates a "pre-cooked product," the structured plant product is typically contacted with browning agents and/or thermally stable pigments. Alternatively, when the restructured meat composition simulates raw meat, the structured protein product is generally contacted with thermally unstable red pigments and also with browning agents, and/or thermally stable pigments, such that when the restructured meat composition is cooked its appearance changes from a raw meat color to fully cooked color. Suitable thermally unstable red pigments, thermally stable pigments, and browning agents are described below.

The colorant(s) may be mixed with the protein-containing material and other ingredients prior to being fed into the extruder. Alternatively, the colorant(s) may be combined with the protein-containing material and other ingredients after being fed into the extruder. In the presence of the heat or the heat and pressure utilized during the extrusion process, some combinations of colorants and protein-containing materials result in unexpected colors. As an example, when carmine (or lac) is contacted with the protein-containing material during the extrusion process, the color changes from red to violet/purple.

The colorant(s) may be a natural colorant, a combination of natural colorants, an artificial colorant, a combination of artificial colorants, or a combination of natural and artificial colorants. Suitable examples of natural colorants approved for use in food include annatto (reddish-orange), anthocyanins (red to blue, depends upon pH), beet juice, beta-carotene (orange), beta-APO 8 carotenal (orange), black currant, burnt sugar; canthaxanthin (pink-red), caramel, carmine/carminic acid (bright red), cochineal extract (red), curcumin (yellow-orange); lac (scarlet red), lutein (red-orange); lycopene (orange-red), mixed carotenoids (orange), monascus (red-purple, from fermented red rice), paprika, red cabbage juice, riboflavin (yellow), saffron, titanium dioxide (white), and turmeric (yellow-orange). Suitable examples of artificial colorants approved for food use in the United States include FD&C Red No. 3 (Erythrosine), FD&C Red No. 40 (Allure Red), FD&C Yellow No. 5 (Tartrazine), FD&C Yellow No. 6 (Sunset Yellow FCF), FD&C Blue No. 1 (Brilliant Blue), FD&C Blue No. 2 (Indigotine). Artificial colorants that may be used in other countries include Cl Food Red 3 (Carmoisine), Cl Food Red 7 (Ponceau 4R), Cl Food Red 9 (Amaranth), Cl Food Yellow 13 (Quinoline Yellow), and Cl Food Blue 5 (Patent Blue V). Food colorants may be dyes, which are powders, granules, or liquids that are soluble in water. Alternatively, natural and artificial food colorants may be lake colors, which are combinations of dyes and insoluble materials. Lake colors are not oil soluble, but are oil dispersible; they tint by dispersion.

Suitable colorant(s) may be combined with the protein-containing materials in a variety of forms. Non-limiting examples include solid, semi-solid, powdered, liquid, and gelatin. The type and concentration of colorant(s) utilized may vary depending on the protein-containing materials used and the desired color of the colored structured protein product. Typically, the concentration of colorant(s) may range from about 0.001% to about 5.0% by weight. In one embodiment, the concentration of colorant(s) may range from about 0.01% to about 4.0% by weight. In another embodiment, the concentration of colorant(s) may range from about 0.05% to about 3.0% by weight. In still another embodiment, the concentration of colorant(s) may range from about 0.1% to about 3.0% by weight. In a further embodiment, the concentration of colorant(s) may range from about 0.5% to about 2.0% by weight. In another embodiment, the concentration of colorant(s) may range from about 0.75% to about 1.0% by weight.

A thermally unstable pigment may be used in the coloring composition to provide the red color of raw uncooked meat. The thermally unstable pigment is typically a food coloring dye or powder having a red color that resembles the red coloration of browning meat in its uncooked state (i.e., raw meat). Generally speaking, the thermally unstable pigment is a food coloring dye or powder having a structure that is degraded upon exposure to temperatures effective to cook a structured protein product. In this manner, the pigment is degraded thermally and as such, is ineffective to provide substantial coloration to the structured protein product when it is cooked. The thermally unstable pigment is typically degraded at temperatures of about 100° C. or greater, more preferably at temperatures of about 75° C. or greater, and most typically at temperatures of about 50° C. or greater. In one embodiment, the thermally unstable pigment is betanin, a red food coloring dye or powder having poor thermal stability. Betanin is derived from red beets and is typically prepared from red beet juice or beet powder. The thermally unstable pigment may be present in the coloring composition from about 0.005% to about 30% by dry weight of the coloring composition. When the thermally unstable pigment is betanin, the betanin preferably forms from about 0.005% to about 0.5% of the coloring composition by dry weight, and more preferably forms from about 0.01% to about 0.05% of the coloring composition by dry weight. Alternatively, a beet powder or beet extract preparation containing betanin may be present in the coloring composition from about 5% to about 30% of the composition by dry weight, and more preferably from about 10% to about 25% of the coloring composition. As an example, the coloring composition could be composed of 0.0087% annatto, 21.68% beet powder, 52.81% dextrose, and 25.43% NFE (all percentages are by weight).

A thermally stable pigment comprised of one or more thermally stable food coloring dyes may be used in the coloring composition. Suitable thermally stable pigments include those that are effective to provide a structured protein product with coloration resembling browned meat in both an uncooked state and a cooked state. Suitable thermally stable pigments include caramel food coloring material, and yellow, brown, and/or orange food-coloring agents. A variety of caramel food coloring agents are useful in the present invention and are commercially available in a powdered form or in a liquid form, including Caramel Color No. 602 (available from the Williamson Company, Louisville, Ky.), and 5440 Caramel Powder D.S. (available from Sensient Colors, Inc., St. Louis, Mo.).

Several types of commercially available yellow/orange food colorings may be used in the thermally stable pigment. Suitable yellow/orange food colors include annatto, turmeric and artificial yellow dyes such as FD&C Yellow #5. The amount of thermally stable pigment present in the coloring composition is from about 0% to about 7% by dry weight of the coloring composition, and more preferably from about 0.1% to about 3% by dry weight of the coloring composition. The yellow/orange food coloring material, preferably annatto, may constitute from about 0% to about 2% of the coloring composition by dry weight, and preferably is present in about 0.1% to about 1%, by dry weight of the coloring composition. The caramel food coloring material typically constitutes from about 0% to about 5% by dry weight, and preferably from about 0.5% to about 3%, by dry weight of the coloring composition.

The coloring composition may include browning agents which comprise an amine source and a reducing sugar. As detailed above, the browning agent generally causes a protein containing material in which the coloring composition is mixed to brown similarly to cook browning meat when the protein material is cooked. In an alternative embodiment, the browning agent of the coloring composition may also include an amine source. An amine compound reacts with a reducing sugar to induce browning. Suitable amine sources include a polypeptide material, a hydrolyzed protein material, or an amino acid material. Without being bound by any particular theory, a polypeptide material, hydrolyzed protein, and/or amino acid material is preferably included as an amine source in the browning agent to enhance the desired browning. In an exemplary embodiment, an isolated soy protein is the source of amine groups in the browning agent. When included in the coloring composition, the amine source is generally present in the coloring composition from about 20% to about 55% of the coloring composition by dry weight. An exemplary browning agent is a reducing sugar. Suitable reducing sugars are typically capable of undergoing a Maillard browning reaction in the presence of compounds containing amine groups to provide the desired browning when a protein containing material is cooked. Representative examples of suitable reducing sugars include xylose, arabinose, galactose, fructose, glycealdehyde, mannose, dextrose, lactose and maltose. In an exemplary embodiment, the reducing sugar is dextrose. The reducing sugar may be present in the coloring composition from about 25% to about 95% by dry weight of the coloring composition, and preferably from about 30% to about 60% by dry weight of the coloring composition.

In an exemplary embodiment, the coloring composition comprises beet pigment, annatto, caramel coloring, a reducing sugar, and an amino acid source. In one alternative of this embodiment, the amino acid source comprises peptides comprised of amino acids and secondary amino acids. In another alternative embodiment, the amino acid source is isolated soy protein.

The coloring composition may further comprise an acidity regulator to maintain the pH in the optimal range for the colorant. The acidity regulator may be an acidulent. Examples of acidulents that may be added to food include citric acid, acetic acid (vinegar), tartaric acid, malic acid, fumaric acid, lactic acid, gluconic acid, phosphoric acid, sorbic acid, hydrochloric acid, propionic acid, and benzoic acid. The final concentration of the acidulent in a coloring composition may range from about 0.001% to about 5% by weight of the coloring composition. The acidity regulator may also be a pH-raising agent, such as disodium biphosphate, sodium carbonate, sodium bicarbonate, sodium hydroxide, and potassium hydroxide.

The coloring composition of the present invention may be prepared by combining the components using processes and procedures known to those of ordinary skill in the art. The components are typically available in either a liquid form or a powder form, and often in both forms. The components can be mixed directly to form the coloring composition, but preferably the ingredients of the coloring composition are combined in an aqueous solution at a total concentration of about 10% to about 25% by weight, where the aqueous coloring solution can be conveniently added to a quantity of water for mixing with and coloring a structured protein product.

(d) Addition of Optional Ingredients

The restructured meat compositions may optionally include a variety of flavorings, spices, antioxidants, or other ingredients to impart a desired flavor or texture or to nutritionally enhance the final food product. As will be appreciated by a skilled artisan, the selection of ingredients added to the restructured meat composition can and will depend upon the food product to be manufactured.

The restructured meat composition may comprise from about 1% to about 30% by weight of a fat source to impart flavor. Typically, the fat source is an animal fat. Suitable animal fats include beef fat, pork fat, poultry fat and lamb fat. In an exemplary embodiment, the restructured meat composition will comprise from about 10% to about 20% by weight of a fat source. In an additional embodiment a plant derived fat source can be used, non-limiting examples include oils such as canola oil, cottonseed oil, grape oil, olive oil, peanut oil, palm oil, soybean oil, sunflower oil, vegetable oil, and combinations thereof. The percentage by weight of the plant derived fat source can be from about 10% to 20%.

The restructured meat compositions may further comprise an antioxidant. The antioxidant may prevent the oxidation of the polyunsaturated fatty acids (e.g., omega-3 fatty acids) in the animal meat, and the antioxidant may also prevent oxidative color changes in the restructured meat composition. The antioxidant may be natural or synthetic. Suitable antioxidants include, but are not limited to, ascorbic acid and its salts, ascorbyl palmitate, ascorbyl stearate, anoxomer, N-acetyl-cysteine, benzyl isothiocyanate, m-aminobenzoic acid, o-aminobenzoic acid, p-aminobenzoic acid (PABA), butylated hydroxyanisole (BHA), butylated hydroxytoluene (BHT), caffeic acid, canthaxantin, alpha-carotene, beta-carotene, beta-caraotene, beta-apo-carotenoic acid, camosol, carvacrol, catechins, cetyl gallate, chlorogenic acid, citric acid and its salts, clove extract, coffee bean extract, p-coumaric acid, 3,4-dihydroxybenzoic acid, N,N'-diphenyl-p-phenylenediamine (DPPD), dilauryl thiodipropionate, distearyl thiodipropionate, 2,6-di-tert-butylphenol, dodecyl gallate, edetic acid, ellagic acid, erythorbic acid, sodium erythorbate, esculetin, esculin, 6-ethoxy-1,2-dihydro-2,2,4-trimethylquinoline, ethyl gallate, ethyl maltol, ethylenediaminetetraacetic acid (EDTA), eucalyptus extract, eugenol, ferulic acid, flavonoids (e.g., catechin, epicatechin, epicatechin gallate, epigallocatechin (EGC), epigallocatechin gallate (EGCG), polyphenol epigallocatechin-3-gallate), flavones (e.g., apigenin, chrysin, luteolin), flavonols (e.g., datiscetin, myricetin, daemfero), flavanones, fraxetin, fumaric acid, gallic acid, gentian extract, gluconic acid, glycine, gum guaiacum, hesperetin, alpha-hydroxybenzyl phosphinic acid, hydroxycinammic acid, hydroxyglutaric acid, hydroquinone, N-hydroxysuccinic acid, hydroxytryrosol, hydroxyurea, rice bran extract, lactic acid and its salts, lecithin, lecithin citrate; R-alpha-lipoic acid, lutein, lycopene, malic acid, maltol, 5-methoxy tryptamine, methyl gallate, monoglyceride citrate; monoisopropyl citrate; morin, beta-naphthoflavone, nordihydroguaiaretic acid (NDGA), octyl gallate, oxalic acid, palmityl citrate, phenothiazine, phosphatidylcholine, phosphoric acid, phosphates, phytic acid, phytylubichromel, pimento extract, propyl gallate, polyphosphates, quercetin, trans-resveratrol, rosemary extract, rosmarinic acid, sage extract, sesamol, silymarin, sinapic acid, succinic acid, stearyl citrate, syringic acid, tartaric acid, thymol, tocopherols (i.e., alpha-, beta-, gamma- and delta-tocopherol), tocotrienols (i.e., alpha-, beta-, gamma- and delta-tocotrienols), tyrosol, vanilic acid, 2,6-di-tert-butyl-4-hydroxymethylphenol (i.e., Ionox 100), 2,4-(tris-3',5'-bi-tert-butyl-4'-hydroxybenzyl)-mesitylene (i.e., Ionox 330), 2,4,5-trihydroxybutyrophenone, ubiquinone, tertiary butyl hydroquinone (TBHQ), thiodipropionic acid, trihydroxy butyrophenone, tryptamine, tyramine, uric acid, vitamin K and derivates, vitamin Q10, wheat germ oil, zeaxanthin, or combinations thereof.

The concentration of an antioxidant in the restructured meat composition may range from about 0.0001% to about 20% by weight. In another embodiment, the concentration of an antioxidant in the restructured meat composition may range from about 0.001% to about 5% by weight. In yet another embodiment, the concentration of an antioxidant in the restructured meat composition may range from about 0.01% to about 1% by weight.

In an additional embodiment, the restructured meat compositions may further comprise at least one flavoring agent. The flavoring agent may be natural, or the flavoring agent may be artificial. The flavoring agent may mimic or replace constituents found in lean meat or fat tissues, such as, serum proteins, muscle proteins, hydrolyzed animal proteins, tallow, fatty acids, etc. The flavoring agent may provide an animal meat flavor, a grilled meat flavor, a rare beef flavor, etc. The flavoring agent may be an animal meat oil, oleoresins or aquaresins of spice extracts, spice oils, natural smoke solutions, natural smoke extracts, a yeast extract, or shiitake extract. Additional flavoring agents may include onion flavor, garlic flavor, or herb flavors. The restructured meat composition may further comprise a flavor enhancer. Examples of flavor enhancers that may be used include salt (sodium chloride), glutamic acid salts (e.g., monosodium glutamate), glycine salts, guanylic acid salts, inosinic acid salts, 5'-ribonucleotide salts, hydrolyzed animal proteins, and hydrolyzed vegetable proteins.

The restructured meat composition may optionally include a variety of flavorings. Suitable flavoring agents include animal meat flavor, animal meat oil, spice extracts, spice oils, natural smoke solutions, natural smoke extracts, yeast extracts, sherry, mint, brown sugar, honey. The flavors and spices may also be available in the form of oleoresins and aquaresins. Other flavoring agents include onion flavor, garlic flavor, or herb flavor. In an alternative embodiment, the flavoring agent may be nutty, sweet, or fruity. Non-limiting examples of suitable fruit flavors include apple, apricot, avocado, banana, blackberry, black cherry, blueberry, boysenberry, cantaloupe, cherry, coconut, cranberry, fig, grape, grapefruit, green apple, honeydew, kiwi, lemon, lime, mango, mixed berry, orange, peach, persimmon, pineapple, raspberry, strawberry, and watermelon. The restructured meat compositions may further include flavor enhancers. Non-limiting examples of suitable flavor enhancers include sodium chloride salt, glutamic acid salts, glycine salts, guanylic acid salts, inosinic acid salts, and 5-ribonucleotide salts, yeast extract, shiitake mushroom extract, dried bonito extract, and kelp extract. The restructured meat compositions may also utilize various sauces and marinades which may be made by fermentation or blending flavors, spices, oils, water, flavor enhancers, antioxidants, acidulents, preservatives, and sweeteners.

In an additional embodiment, the restructured meat compositions may further comprise a thickening or a gelling agent, such as alginic acid and its salts, agar, carrageenan and its salts, processed *Eucheuma* seaweed, gums (Gum Arabic, carob bean, locust bean, guar, tragacanth, and xanthan), pectins, sodium carboxymethylcellulose, methylcellulose, and modified starches.

In a further embodiment, the restructured meat compositions may further comprise a nutrient such as a vitamin, a mineral, an antioxidant, an omega-3 fatty acid, or an herb. Suitable vitamins include Vitamins A, C, and E, which are also antioxidants, and Vitamins B and D. Examples of minerals that may be added include the salts of aluminum, ammonium, calcium, magnesium, iron, and potassium. Suitable omega-3 fatty acids include docosahexaenoic acid (DHA), EPA (eicosapentanoic acid) and ALA (alpha-linolenic acid). Herbs that may be added include bay leaves, basil, celery leaves, chervil, chives, cilantro, coriander, cumin, dill, ginger, mace, marjoram, pepper, tumeric, parsley, oregano, tarragon, and thyme.

(III) Food Products

The restructured meat compositions may be processed into a variety of food product having a variety of shapes. When the protein composition further comprises at least one ingredient selected from the group consisting of a gelling protein, an animal fat, sodium chloride, phosphates (sodium tripolyphosphate, sodium acid pyrophsphates, hexa metaphosphate, etc.), a colorant, a curing agent, an antioxidant, an antimicrobial agent, a flavorant, or mixtures thereof, the product and process are completed in a procedure similar to the product and process utilizing only the structured protein products, animal meat, and water. The protein composition is first hydrated with water and shredded to expose and separate the fibers. When hydration and shredding are complete, a colorant is added. The animal meat and water are added and the contents are mixed until a homogeneous mass is obtained. This is followed by the addition of an animal fat, a flavorant, sodium chloride, phosphates, and the gelling protein. In an additional embodiment, sodium nitrate may be added along with salt and phosphates.

The resulting homogeneous restructured meat product may be formed into strips, steaks, cutlets, patties, or generally cube-shaped for kabobs, either by hand or by machine. The restructured meat product may be formed into meat sticks. The restructured meat product may also be stuffed into permeable or impermeable casings to form sausages.

The restructured meat product once formed is either cooked, partially cooked for finishing at a later time or frozen either in an uncooked state, partially cooked state or cooked state. Cooking includes frying either as sautéing or as deep-frying, baking, smoking and impingement cooking and steaming. The fully cooked restructured meat product may be further sliced, shredded, or ground.

Further, the restructured meat product may be subjected to fermentation. Meat products are fermented by adjusting the pH of the meat product to between about 4.0 to about 5.2. Fermentation is accomplished by the addition of a lactic acid culture. Acidification may also be performed by direct acidification using citric acid, lactic acid, glucono delta lactone, and mixtures thereof.

The restructured meat product (before drying, partially dried, dried, cooked or uncooked) may be packaged as is. Further processing of the restructured meat product (before drying, partially dried, dried, cooked or uncooked) may be shock-frozen, for example in a freeze tunnel, and subsequent automatic portion packaging in containers of a suitable type, for example, plastic pouches or the like. Said type of further processing and packaging is suitable if the product is intended for fast-food outlets or for food service applications, where the product is usually deep-fried or baked before consumption.

Alternatively, after the formation of the restructured meat product (before drying, partially dried, dried, cooked or uncooked), it is also possible to spray the surface of the product with carbohydrate solutions or related substances in order to obtain uniform browning during deep frying or baking. Subsequently, the product can now be shock frozen and sold portion packed (i.e. in pouches). The restructured meat product can also be baked or processed in a convection oven by the consumer, instead of deep frying. Further, the restructured meat product also can be breaded prior to or after cooking, or coated with another type of coating. Additionally, the restructured meat product can be retort cooked in order to kill any microbes that might be present.

The restructured meat product either cooked or uncooked may also be packed and sealed in cans in a conventional manner and employing conventional sealing procedures. Normally, the cans at this stage are maintained at a temperature of between 65° C. and 77° C. and are carried to a retort or cooking stage as quickly as possible to prevent there being any risk of microbiological spoilage during the time between canning and sterilization during the retort or cooking stage. The restructured meat stuffed in impermeable casings designed for retort cooking may be cooked in the retort cooker to make a shelf stable sausage.

In order to ensure that the restructured meat product, once formed, has the texture of intact muscles, it is necessary that at least about 75 weight % of the protein composition contains at least about 15 weight % of large pieces comprised of vegetable protein fibers at least about 4 centimeters long, vegetable protein strands at least about 3 centimeters long, and vegetable protein chunks at least about 2 centimeters long and that at least about 75 weight % of the protein composition has a shear strength of at least about 1400 grams.

A vegetable product may be prepared by a process of combining a protein composition, preferably a hydrated and shredded soy protein composition; wherein about 75 weight % of the protein composition is comprised of at least about 15 weight % of fragments comprised of protein fibers at least about 4 centimeters long, protein strands at least about 3 centimeters long, and protein chunks at least about 2 centimeters long; and wherein at least about 75 weight % of the protein composition has a shear strength of at least about 1400 grams; with a comminuted vegetable; and mixing the preferred hydrated and shredded soy protein composition and the comminuted vegetable to produce a homogeneous, fibrous and structured vegetable product having protein fibers that are substantially aligned.

Examples of vegetable products prepared by the above process are vegetarian food products including vegetarian patties, vegetarian hot dogs, vegetarian sausages, and vegetarian crumbles. Another example of a vegetarian food product is cheeses that are extended with the hydrated and shredded protein composition.

A fruit product may be prepared by combining a protein composition, preferably a hydrated and shredded soy protein composition; wherein about 75 weight % of the protein composition is comprised of at least about 15 weight % of fragments comprised of protein fibers at least about 4 centimeters long, protein strands at least about 3 centimeters long, and protein chunks at least about 2 centimeters long; and wherein at least about 75 weight % of the protein composition has a shear strength of at least about 1400 grams; with a comminuted fruit; and mixing the preferred hydrated and shredded soy protein composition and the comminuted fruit to produce a homogeneous, fibrous and structured fruit product having protein fibers that are substantially aligned.

Examples of fruit products prepared by the above process are snack food products including fruit rollups, cereals, and fruit crumbles.

Definitions

The term "animal meat" as used herein refers to the flesh, whole meat muscle, or parts thereof derived from an animal.

The term "comminuted fruit" as used herein refers to a puree of a single fruit or a mixture of a puree of more than one fruit.

The term "comminuted meat" as used herein refers to a meat paste that is recovered from an animal carcass. The meat, on or off the bone is forced through a deboning device such that meat is separated from the bone and reduced in size.

The term "comminuted vegetable" as used herein refers to a puree of a single vegetable or a mixture of a puree of more than one vegetable.

The term "extrudate" as used herein refers to the product of extrusion. In this context, the plant protein products comprising protein fibers that are substantially aligned may be extrudates in some embodiments.

The term "fiber" as used herein refers to a plant protein product having a size of approximately 4 centimeters in length and 0.2 centimeters in width after the shred characterization test detailed in Example 2 is performed. In this context, the term "fiber" does not include the nutrient class of fibers, such as soybean cotyledon fibers, and also does not refer to the structural formation of substantially aligned protein fibers comprising the plant protein products.

The term "gluten" as used herein refers to a protein fraction in cereal grain flour, such as wheat, that possesses a high content of protein as well as unique structural and adhesive properties.

The term "gluten free starch" as used herein refers to various starch products such as modified tapioca starch. Gluten free or substantially gluten free starches are made from wheat, corn, and tapioca based starches. They are gluten free because they do not contain the gluten from wheat, oats, rye or barley.

The term "hydration test" as used herein measures the amount of time in minutes necessary to hydrate a known amount of the protein composition.

The term "large piece" as used herein is the manner in which a colored or uncolored structured plant protein product's shred percentage is characterized. The determination of shred characterization is detailed in Example 2.

The term "mechanically deboned meat (MDM)" as used herein refers to a meat paste that is recovered from beef, pork and chicken bones using commercially available equipment. MDM is a comminuted product that is devoid of the natural fibrous texture found in intact muscles.

The term "moisture content" as used herein refers to the amount of moisture in a material. The moisture content of a material can be determined by A.O.C.S. (American Oil Chemists Society) Method Ba 2a-38 (1997), which is incorporated herein by reference in its entirety.

The term "protein content," as for example, soy protein content as used herein, refers to the relative protein content of a material as ascertained by A.O.C.S. (American Oil Chemists Society) Official Methods Bc 4-91(1997), Aa 5-91(1997), or Ba 4d-90(1997), each incorporated herein by reference in their entirety, which determine the total nitrogen content of a material sample as ammonia, and the protein content as 6.25 times the total nitrogen content of the sample.

The term "protein fiber" as used herein refers to the individual continuous filaments or discrete elongated pieces of varying lengths that together define the structure of the plant protein products of the invention. Additionally, because both the colored and uncolored structured plant protein products of the invention have protein fibers that are substantially aligned, the arrangement of the protein fibers impart the texture of whole meat muscle to the colored and uncolored structured plant protein products.

The term "shear strength" as used herein measures the ability of a textured protein to form a fibrous network with a strength high enough to impart meat-like texture and appearance to a formed product. Shear strength is measured in grams.

The term "simulated" as used herein refers to an animal meat composition that contains no animal meat.

The term "soy cotyledon fiber" as used herein refers to the polysaccharide portion of soy cotyledons containing at least about 70% dietary fiber. Soy cotyledon fiber typically contains some minor amounts of soy protein, but may also be 100% fiber. Soy cotyledon fiber, as used herein, does not refer to, or include, soy hull fiber. Generally, soy cotyledon fiber is formed from soybeans by removing the hull and germ of the soybean, flaking or grinding the cotyledon and removing oil from the flaked or ground cotyledon, and separating the soy cotyledon fiber from the soy material and carbohydrates of the cotyledon.

The term "soy protein concentrate" as used herein is a soy material having a protein content of from about 65% to less than about 90% soy protein on a moisture-free basis. Soy protein concentrate also contains soy cotyledon fiber, typically from about 3.5% up to about 20% soy cotyledon fiber by weight on a moisture-free basis. A soy protein concentrate is formed from soybeans by removing the hull and germ of the soybean, flaking or grinding the cotyledon and removing oil from the flaked or ground cotyledon, and separating the soy protein and soy cotyledon fiber from the soluble carbohydrates of the cotyledon.

The term "soy flour" as used herein, refers to a comminuted form of defatted soybean material, preferably containing less than about 1% oil, formed of particles having a size such that the particles can pass through a No. 100 mesh (U.S. Standard)

screen. The soy cake, chips, flakes, meal, or mixture of the materials are comminuted into soy flour using conventional soy grinding processes. Soy flour has a soy protein content of about 49% to about 65% on a moisture free basis. Preferably the flour is very finely ground, most preferably so that less than about 1% of the flour is retained on a 300 mesh (U.S. Standard) screen.

The term "soy protein isolate" as used herein is a soy material having a protein content of at least about 90% soy protein on a moisture free basis. A soy protein isolate is formed from soybeans by removing the hull and germ of the soybean from the cotyledon, flaking or grinding the cotyledon and removing oil from the flaked or ground cotyledon, separating the soy protein and carbohydrates of the cotyledon from the cotyledon fiber, and subsequently separating the soy protein from the carbohydrates.

The term "strand" as used herein refers to a plant protein product having a size of approximately 2.5 to about 4 centimeters in length and greater than approximately 0.2 centimeter in width after the shred characterization test detailed in Example 2 is performed.

The term "starch" as used herein refers to starches derived from any native source. Typically sources for starch are cereals, tubers, roots, legumes, and fruits.

The term "weight on a moisture free basis" as used herein refers to the weight of a material after it has been dried to completely remove all moisture, e.g. the moisture content of the material is 0%. Specifically, the weight on a moisture free basis of a material can be obtained by weighing the material after the material has been placed in a 45° C. oven until the material reaches a constant weight.

The term "wheat flour" as used herein refers to flour obtained from the milling of wheat. Generally speaking, the particle size of wheat flour is from about 14 to about 120 µm.

The following examples are included to demonstrate preferred embodiments of the invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the spirit and scope of the invention, therefore all matter set forth or shown in the accompanying drawings is to be interpreted as illustrative and not in a limiting sense.

EXAMPLES

Examples 1-105 illustrate various embodiments of the invention.

Example 1 Determination of Shear Strength

Shear strength of a sample is measured in grams and may be determined by the following procedure. Weigh a sample of the structured protein product and place it in a heat sealable pouch and hydrate the sample with approximately three times the sample weight of room temperature tap water. Evacuate the pouch to a pressure of about 0.01 Bar and seal the pouch. Permit the sample to hydrate for about 12 to about 24 hours. Remove the hydrated sample and place it on the texture analyzer base plate oriented so that a knife from the texture analyzer will cut through the diameter of the sample. Further, the sample should be oriented under the texture analyzer knife such that the knife cuts perpendicular to the long axis of the textured piece. A suitable knife used to cut the extrudate is a model TA-45, incisor blade manufactured by Texture Technologies (USA). A suitable texture analyzer to perform this test is a model TA, TXT2 manufactured by Stable Micro Systems Ltd. (England) equipped with a 25, 50, or 100 kilogram load. Within the context of this test, shear strength is the maximum force in grams needed to shear through the sample.

Example 2 Determination of Shred Characterization

A procedure for determining shred characterization may be performed as follows. Weigh about 150 grams of a structured protein product using whole pieces only. Place the sample into a heat-sealable plastic bag and add about 450 grams of water at 25° C. Vacuum seal the bag at about 150 mm Hg and allow the contents to hydrate for about 60 minutes. Place the hydrated sample in the bowl of a Kitchen Aid mixer model KM14GO equipped with a single blade paddle and mix the contents at 130 rpm for two minutes. Scrape the paddle and the sides of the bowl, returning the scrapings to the bottom of the bowl. Repeat the mixing and scraping two times. Remove ~200 g of the mixture from the bowl. Separate that mixture such that all fibers or long strands longer that 2.5 cm are segregated from the shredded mixture. Weigh the population of fibers sorted from the shredded mixture, divide this weight by the starting weight (e.g. ~200 g), and multiply this value by 100. This determines the percentage of large pieces in the sample. If the resulting value is below 15%, or above 20%, the test is complete. If the value is between 15% and 20%, then weigh out another ~200 g from the bowl, separate the fibers or long strands longer that 2.5 cm from the shredded mixture, and perform the calculations again.

Example 3 Production of Plant Protein Products

The following extrusion process may be used to prepare the colored structured plant protein products of the invention. Added to a dry blend mixing vessel are the following: 1000 kilograms (kg) Supro 620 (soy isolate), 440 kg wheat gluten, 236 kg wheat starch, 34 kg soy cotyledon fiber, 8 kg dicalcium phosphate, and 2 kg L-cysteine. The contents are mixed to form a dry blended soy protein mixture. The dry blend is then transferred to a hopper from which the dry blend is introduced into a preconditioner along with 480 kg of water to form a conditioned soy protein pre-mixture. The conditioned soy protein pre-mixture is then fed to a twin-screw extrusion apparatus at a rate of not more than 25 kg/minute. The extrusion apparatus comprises five temperature control zones, with the protein mixture being controlled to a temperature of from about 25° C. in the first zone, about 50° C. in the second zone, about 95° C. in the third zone, about 130° C. in the fourth zone, and about 150° C. in the fifth zone. The extrusion mass is subjected to a pressure of at least about 400 psig in the first zone up to about 1500 psig in the fifth zone. Water, 60 kg, is injected into the extruder barrel, via one or more injection jets in communication with a heating zone.

A die assembly is attached to the extruder in an arrangement that permits the plasticized mixture to flow from the extruder exit port into the die assembly and produces substantial alignment of the protein fibers within the plasticized mixture as it flows through the die assembly.

As the extrudate containing protein fibers that are substantially aligned exits the die assembly, it is cut with knives and the cut mass is then dried to a moisture content of about 10% by weight. Once dry, a portion of the cut mass is sized into small pieces and larger pieces. A total of 25 pieces are obtained for each size. These pieces are then measured and tabulated in Table IV.

TABLE IV

| Sample Number | Small Pieces L (mm) | Small Pieces W (mm) | | Large Pieces L (mm) | Large Pieces W (mm) |
|---|---|---|---|---|---|
| 1 | 11 | 10 | | 16 | 11 |
| 2 | 10 | 6 | | 16 | 13 |
| 3 | 8 | 8 | | 22 | 11 |
| 4 | 11 | 8 | | 19 | 11 |
| 5 | 14 | 9 | | 17 | 11 |
| 6 | 10 | 8 | | 20 | 13 |
| 7 | 14 | 4 | | 15 | 10 |
| 8 | 8 | 6 | | 21 | 12 |
| 9 | 10 | 8 | | 19 | 12 |
| 10 | 11 | 8 | | 12 | 12 |
| 11 | 13 | 8 | | 15 | 10 |
| 12 | 19 | 9 | | 17 | 9 |
| 13 | 12 | 9 | | 11 | 10 |
| 14 | 14 | 6.5 | | 14 | 10 |
| 15 | 10 | 7 | | 14 | 10 |
| 16 | 10 | 7 | | 17 | 12 |
| 17 | 10 | 6 | | 15 | 13 |
| 18 | 12 | 8 | | 14 | 14 |
| 19 | 10 | 7 | | 19 | 12 |
| 20 | 9 | 6 | | 18 | 10 |
| 21 | 10 | 8 | | 14 | 12 |
| 22 | 9 | 5 | | 19 | 12 |
| 23 | 10 | 7 | | 12 | 11 |
| 24 | 11 | 9 | | 16 | 10 |
| 25 | 9 | 8 | | 16 | 9 |
| Avg | 11.0 | 7.4 | Avg | 16.3 | 11.2 |
| Std. Dev | 2.3 | 1.4 | Std. Dev. | 2.8 | 1.3 |
| Max | 19.0 | 10.0 | Max | 22.0 | 14.0 |
| Min | 8.0 | 4.0 | Min | 11.0 | 9.0 |

Examples 4-94 Production of Plant Protein Products

Examples 4-94 are repeats of Example 3. Table V below delineates the analyses of Examples 3-94.

TABLE V

| Example Number# | % Large Pieces | Shear Strength (g) | Hydration | Density (g/cc) |
|---|---|---|---|---|
| 3 | 30.2 | 2150 | 80 | 0.27 |
| 4 | 24.2 | 2366 | 80 | 0.24 |
| 5 | 29.4 | 2341 | 60 | 0.30 |
| 6 | 26.0 | 2142 | 70 | 0.29 |
| 7 | 27.1 | 2291 | 70 | 0.28 |
| 8 | 32.7 | 2442 | 70 | 0.23 |
| 9 | 17.4 | 2668 | 70 | 0.27 |
| 10 | 26.1 | 2511 | 90 | 0.26 |
| 11 | 21.1 | 2260 | 80 | 0.28 |
| 12 | 22.3 | 2421 | 80 | 0.24 |
| 13 | 21.9 | 2490 | 75 | 0.28 |
| 14 | 22.4 | 2438 | 104 | 0.28 |
| 15 | 7.8 | 59 | 81 | 0.30 |
| 16 | 7.3 | 675 | 83 | 0.28 |
| 17 | 9.3 | 553 | 100 | 0.24 |
| 18 | 7.3 | 226 | 90 | 0.23 |
| 19 | 3.5 | 412 | 72 | 0.24 |
| 20 | 0.0 | 055 | 100 | 0.23 |
| 21 | 2.6 | 511 | 75 | 0.25 |
| 22 | 2.7 | 168 | 100 | 0.25 |
| 23 | 2.0 | 207 | 102 | 0.25 |
| 24 | 7.7 | 247 | 62 | 0.29 |
| 25 | 1.2 | 51 | 73 | 0.28 |
| 26 | 0.2 | 164 | 63 | 0.27 |
| 27 | 6.6 | 966 | 68 | 0.28 |
| 28 | 4.9 | 164 | 50 | 0.31 |
| 29 | 5.0 | 812 | 58 | 0.28 |
| 30 | 9.6 | 108 | 60 | 0.31 |
| 31 | 5.8 | 864 | 70 | 0.27 |
| 32 | 6.5 | 473 | 58 | 0.25 |
| 33 | 0.7 | 879 | 65 | 0.28 |
| 34 | 5.4 | 688 | 70 | 0.29 |
| 35 | 0.3 | 038 | 74 | 0.26 |
| 36 | 9.3 | 074 | 73 | 0.28 |
| 37 | 1.5 | 937 | 70 | 0.39 |
| 38 | 2.5 | 462 | 77 | 0.40 |
| 39 | 0.1 | 051 | 66 | 0.28 |
| 40 | 7.9 | 384 | 54 | 0.31 |
| 41 | 8.1 | 064 | 58 | 0.28 |
| 42 | 9.2 | 158 | 60 | 0.27 |
| 43 | 0.0 | 834 | 58 | 0.28 |
| 44 | 6.8 | 202 | 58 | 0.28 |
| 45 | 2.8 | 363 | 57 | 0.26 |
| 46 | 3.9 | 361 | 57 | 0.28 |
| 47 | 6.9 | 293 | 103 | 0.25 |
| 48 | 6.3 | 205 | 73 | 0.28 |
| 49 | 9.0 | 286 | 53 | 0.29 |
| 50 | 2.6 | 206 | 63 | 0.25 |
| 51 | 0.5 | 125 | 63 | 0.31 |
| 52 | 5.5 | 290 | 55 | 0.29 |
| 53 | 8.2 | 274 | 55 | 0.26 |
| 54 | 1.5 | 205 | 42 | 0.33 |
| 55 | 1.3 | 185 | 55 | 0.31 |
| 56 | 1.8 | 969 | 40 | 0.30 |
| 57 | 9.1 | 028 | 55 | 0.31 |
| 58 | 7.2 | 598 | 63 | 0.37 |
| 59 | 8.3 | 869 | 60 | 0.31 |
| 60 | 9.7 | 044 | 50 | 0.29 |
| 61 | 7.6 | 216 | 52 | 0.28 |
| 62 | 5.0 | 001 | 53 | 0.28 |
| 63 | 8.1 | 096 | 45 | 0.27 |
| 64 | 9.0 | 796 | 53 | 0.27 |
| 65 | 0.0 | 924 | 51 | 0.27 |
| 66 | 3.7 | 295 | 51 | 0.28 |
| 67 | 7.4 | 259 | 50 | 0.29 |
| 68 | 9.2 | 204 | 43 | 0.28 |
| 69 | 5.3 | 059 | 38 | 0.31 |
| 70 | 6.1 | 284 | 70 | 0.32 |
| 71 | 3.6 | 085 | 70 | 0.30 |
| 72 | 5.6 | 279 | 44 | 0.28 |
| 73 | 3.7 | 170 | 44 | 0.32 |
| 74 | 1.2 | 128 | 49 | 0.29 |
| 75 | 2.4 | 068 | 50 | 0.29 |
| 76 | 0.1 | 939 | 40 | 0.30 |
| 77 | 8.7 | 592 | 50 | 0.30 |
| 78 | 9.6 | 812 | 68 | 0.28 |
| 79 | 5.2 | 848 | 64 | 0.28 |
| 80 | 3.6 | 973 | 70 | 0.30 |
| 81 | 3.7 | 078 | 66 | 0.36 |
| 82 | 5.6 | 940 | 44 | 0.31 |
| 83 | 8.5 | 339 | 33 | 0.29 |
| 84 | 0.2 | 366 | 50 | 0.24 |
| 85 | 8.1 | 425 | 40 | 0.29 |
| 86 | 9.6 | 122 | 59 | 0.27 |
| 87 | 7.5 | 193 | 56 | 0.16 |
| 88 | 1.1 | 186 | 56 | 0.28 |
| 89 | 2.4 | 061 | 56 | 0.27 |
| 90 | 1.3 | 143 | 50 | 0.27 |
| 91 | 4.4 | 108 | 54 | 0.26 |
| 92 | 9.9 | 101 | 53 | 0.30 |
| 93 | 2.3 | 551 | 55 | 0.25 |
| 94 | 4.3 | 164 | 57 | 0.28 |
| 1st Quartile | 2.6 | 045 | 53 | 0.27 |
| Median | 6.5 | 164 | 60 | 0.28 |
| 3rd Quartile | 0.2 | 291 | 70 | 0.30 |
| Mean | 6.6 | 156 | 63 | 0.28 |

Example 95 Production of Protein Composition

Added to a mixing vessel are 3625 grams of tap water at about 10° C. (50° F.) and while stirring 1160 grams of a dried, low moisture (about 7% to about 12%) soy protein composition, identified as FXP MO339, available from Solae, LLC, St. Louis, Mo. comprising a soy protein isolate, soy cotyledon fiber, wheat gluten and starch is added until the soy protein composition is hydrated and the fibers are separated. Added to the mixer are 5216 grams of comminuted meat of mechanically deboned chicken having a moisture content of at least about 50%. The mechanically deboned chicken is at a temperature of from about 2° C. (36° F.) to about 4° C. (39° F.). The contents are mixed until a homogeneous restructured meat product is obtained. The restructured meat product is transferred to a Hollymatic forming machine where the restructured meat product is formed into steaks or cutlets that are then frozen.

The procedure of Example 3 is repeated, except that 1500 grams of a non-dried low moisture (about 28-about 35%) soy protein composition comprising a soy protein isolate, soy cotyledon fiber, wheat gluten and starch is hydrated with 3175 grams water. The restructured meat product is transferred to a stuffing machine where the restructured meat product is stuffed into impermeable casings, which are then frozen. Stuffing machines are available from various commercial manufacturers including, but not limited to, HITEC Food Equipment, Inc., located in Elk Grove Village, Ill., Townsend Engineering Co., located in Des Moines, Iowa, Robert Reiser & Co., Inc., located in Canton, Mass., and Handtmann, Inc., located in Buffalo Grove, Ill.

Example 97

Added to a first mixing vessel are 2127 grams of tap water at about 12° C. (54° F.) and while stirring 1000 grams of a dried, low moisture (about 7% to about 12%) soy protein composition is added until the soy protein composition is hydrated and the fibers are separated. Caramel coloring, 43 grams, is then added to the hydrated soy protein composition. At about 2° C. (36° F.), 4500 grams of a comminuted meat of mechanically deboned chicken having a moisture content of about 50% is added. Then added are 100 grams sodium chloride and 30 grams of sodium tripolyphosphate to extract/solubilize myofibriller protein in the comminuted meat for binding. As mixing is continued, 500 grams beef fat and 100 grams beef flavor are added and mixing is continued. In a second mixing vessel, a gelling protein of 600 grams of Supro® 620 is hydrated in 1000 grams water and is added to the first mixing vessel. The contents are mixed until a homogeneous restructured meat product is obtained. The restructured meat product is transferred to a Hollymatic (Hollymatic Corp., Park Forest Ill.) forming machine where the restructured meat product is formed into patties, which are then frozen.

Example 98

Added to a mixing vessel are 3000 grams of tap water at about 10° C. (50° F.) and while stirring 1500 grams of a soy protein extrudate prepared from Supro® 620 is added until the soy protein composition is hydrated and the fibers are separated by shredding. Added to the mixer are 5000 grams of a comminuted meat of mechanically deboned chicken having a moisture content of at least about 50%. The mechanically deboned chicken is at a temperature of from about 2° C. (36° F.) to about 4° C. (39° F.). The contents are mixed until a homogeneous restructured meat product is obtained. The restructured meat product is transferred to a Hollymatic forming machine where the restructured meat product is formed into steaks or cutlets that are then frozen.

Example 99

The procedure of Example 98 is repeated except that the hydrated and shredded soy protein composition comprises a soy protein isolate, rice flour, and a gluten free starch.

Example 100

The procedure of Example 98 is repeated except that the hydrated and shredded soy protein composition comprises a soy protein isolate and rice flour.

Example 101

The procedure of Example 98 is repeated except that the hydrated and shredded soy protein composition comprises a soy protein isolate and a gluten free starch.

Example 102

The procedure of Example 98 is repeated except that the hydrated and shredded soy protein composition comprises a soy protein isolate, wheat flour and starch.

Example 103

The procedure of Example 98 is repeated except that the hydrated and shredded soy protein composition comprises a soy protein isolate and soy cotyledon fiber.

Example 104

The procedure of Example 98 is repeated except that the hydrated and shredded soy protein composition comprises a soy protein isolate, soy cotyledon fiber, and wheat gluten.

Example 105

Added to a mixing vessel are 3383 grams of tap water at about 10° C. (50° F.) and while stirring 1208 grams of a dried, low moisture (about 7% to about 12%) soy protein extrudate, identified as SUPROMAX® 5050, is added until the soy protein extrudate is hydrated and the fibers are separated by shredding. Added to the mixer are 3340 grams of a comminuted meat of mechanically deboned chicken having a moisture content of at least about 50% and 3383 grams of beef of a ½ inch grind having a fat content of about 10%. The mechanically deboned chicken and the beef grind are at a temperature of from about 2° C. (36° F.) to about 4° C. (39° F.). Also added are various colorants and flavorants of salt, erythorbate, sodium nitrite, dextrose, cracked black pepper, nutmeg, mace, granulated garlic, coriander, red pepper, and a rehydrated LHP starter culture. The contents are mixed until a homogeneous restructured meat product is obtained. The restructured meat product is then formed into meat sticks.

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:
1. A restructured meat composition, the composition comprising:
   a) an animal meat; and
   b) a structured plant protein product, the structured plant protein product having protein fibers that are substantially aligned, such that an average of at least 55% of the protein fibers comprising the structured plant protein product are contiguous to each other at less than a 45 degree angle when viewed in a horizontal plane, wherein the structured plant protein product is an extrudate made from ingredients comprising plant proteins, and wherein the structured plant protein product has an average shear strength of at least 1400 grams and an average shred characterization of at least 10% by weight large pieces.

2. The restructured meat composition of claim 1, wherein the composition comprises from about 40% to about 60% by weight of the structured plant protein product, and from about 40% to about 60% by weight of meat.

3. The restructured meat composition of claim 1, further comprising a fat source in an amount ranging from about 10% to about 20% by weight of the composition.

4. The restructured meat composition of claim 1, wherein the structured plant protein product comprises protein fibers substantially aligned in the manner depicted in the micrographic image of FIG. 1.

5. The restructured meat composition of claim 1, wherein the structured plant protein product comprises soy protein, starch, gluten, and fiber.

6. The restructured meat composition of claim 5, wherein the structured plant protein product comprises:
   a from about 45% to about 65% soy protein on a dry matter basis;
   b from about 20% to about 30% wheat gluten on a dry matter basis;
   c from about 10% to about 15% wheat starch on a dry matter basis;
   d from about 1% to about 5% fiber on a dry matter basis.

7. The restructured meat composition of claim 1, wherein the meat is selected from beef, pork, lamb, turkey, and chicken.

8. The restructured meat composition of claim 1, further comprising a color composition.

9. The restructured meat composition of claim 8, wherein the coloring composition comprises beet, annatto, caramel coloring, and an amino acid source.

10. The restructured meat composition of claim 1, further comprising isolated soy protein.

11. The restructured meat composition of claim 1, further comprising an antioxidant, water, spices and flavoring.

12. The restructured meat composition of claim 1, wherein the structured plant protein product is extruded through a die assembly resulting in a structured plant protein product having protein fibers that are substantially aligned.

13. A composition or product, the composition or product comprising an animal meat and a structured plant protein product, the structured plant protein product having protein fibers that are substantially aligned, such that an average of at least 55% of the protein fibers comprising the structured protein product are contiguous to each other at less than a 45 degree angle when viewed in a horizontal plane, wherein the structured plant protein product is an extrudate made from ingredients comprising plant proteins, and wherein the structured plant protein product has an average shear strength of at least 1400 grams, and an average shred characterization of at least 10% by weight large pieces.

* * * * *